(12) United States Patent
Higuchi et al.

(10) Patent No.: US 12,269,297 B2
(45) Date of Patent: *Apr. 8, 2025

(54) TIRE

(71) Applicant: Sumitomo Rubber Industries, Ltd., Kobe (JP)

(72) Inventors: Keiji Higuchi, Kobe (JP); Ryota Ikeda, Kobe (JP); Yuto Ohte, Kobe (JP); Takuya Osawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/269,776

(22) PCT Filed: Nov. 24, 2021

(86) PCT No.: PCT/JP2021/042992
§ 371 (c)(1),
(2) Date: Jun. 27, 2023

(87) PCT Pub. No.: WO2022/145151
PCT Pub. Date: Jul. 7, 2022

(65) Prior Publication Data
US 2024/0316991 A1  Sep. 26, 2024

(30) Foreign Application Priority Data

Dec. 28, 2020 (JP) .................................. 2020-218181
Dec. 28, 2020 (JP) .................................. 2020-218183
Dec. 28, 2020 (JP) .................................. 2020-218184

(51) Int. Cl.
*B60C 11/12* (2006.01)
*B60C 11/03* (2006.01)
*B60C 11/13* (2006.01)

(52) U.S. Cl.
CPC ...... *B60C 11/1236* (2013.01); *B60C 11/0302* (2013.01); *B60C 11/0304* (2013.01); *B60C 11/1281* (2013.01); *B60C 2011/133* (2013.01)

(58) Field of Classification Search
CPC ............. B60C 11/1204; B60C 11/1281; B60C 11/1392; B60C 11/0304; B60C 2011/133
See application file for complete search history.

(56) References Cited

U.S. PATENT DOCUMENTS

2014/0283967 A1  9/2014 Inoue
2018/0086148 A1* 3/2018 Kujime ............... B60C 11/0311
(Continued)

FOREIGN PATENT DOCUMENTS

EP  3305552 A1  4/2018
EP  3689643 A1  8/2020
(Continued)

OTHER PUBLICATIONS

English machine translation of JP2000158916 (Year: 2000).*
(Continued)

*Primary Examiner* — Robert C Dye
(74) *Attorney, Agent, or Firm* — Birch, Stewart, Kolasch & Birch, LLP

(57) ABSTRACT

A tire comprises a tread portion comprising circumferential grooves and land portions divided thereby. The land portions include a first shoulder land portion and a first middle land portion adjacent thereto. The first shoulder land portion is provided with first shoulder sipes. The middle land portion is provided with first middle sipes. Each of the first shoulder sipes and the first middle sipes comprises a main portion extending in the tire radial direction, and a widened portion having a width greater than the main portion and opened at the tread surface of the land portion. The opening width of
(Continued)

the first shoulder sipe at the tread surface is larger than the opening width of the first middle sipe at the tread surface.

13 Claims, 14 Drawing Sheets

(56) References Cited

U.S. PATENT DOCUMENTS

| | | | |
|---|---|---|---|
| 2019/0061435 A1* | 2/2019 | Kajita | B60C 11/1315 |
| 2019/0160880 A1* | 5/2019 | Wakasugi | B60C 11/1204 |
| 2021/0291595 A1 | 9/2021 | Shimizu | |
| 2022/0203773 A1* | 6/2022 | Hagihara | B60C 11/1263 |
| 2022/0203774 A1* | 6/2022 | Kuriyama | B60C 11/0304 |

FOREIGN PATENT DOCUMENTS

| | | |
|---|---|---|
| JP | 2000-158916 A | 6/2000 |
| JP | 2014-184828 A | 10/2014 |
| WO | WO 2020/021869 A1 | 1/2020 |

OTHER PUBLICATIONS

International Search Report for PCT/JP2021/042992 (PCT/ISA/210) mailed on Feb. 1, 2022.
Written Opinion of the International Searching Authority for PCT/JP2021/042992 (PCT/ISA/237) mailed on Feb. 1, 2022.
Extended European Search Report for European Application No. 21915012.5, dated Apr. 22, 2024.

* cited by examiner

TIRE

TECHNICAL FIELD

The present disclosure relates to a tire.

BACKGROUND ART

In the pneumatic tire disclosed in Patent Document 1 below, the tread portion is divided into an outer middle land portion and an inner middle land portion, and these land portions consist of ribs provided with only sipes having widths of less than 2 mm. In this pneumatic tire, the sipes optimize the pattern rigidity of the middle land portions and improves the steering stability and ride comfort in a well-balanced manner.

Patent Document 1: Japanese Patent Application Publication No. 2014-184828

SUMMARY OF THE INVENTION

Problems to be Solved by the Invention

In the tire of Patent Document 1, when braking on a dry road surface, the opening edge on the leading-edge side of the sipe within the ground contacting surface is deformed by shearing force so that the edge can be rolled up by shear force, and the contact pressure around the sipe is locally reduced. For this reason, the above tire tends to have low braking performance on dry road surfaces.

In view of the problems described above, the present disclosure has been devised, and a primary objective thereof is to provide a tire capable of exhibiting excellent braking performance on dry road surfaces.

Means for Solving the Problems

The present disclosure is a tire having a tread portion, the tread portion comprising a plurality of circumferential grooves continuously extending in a tire circumferential direction between a first tread edge and a second tread edge, and a plurality of land portions divided by the circumferential grooves, the plurality of land portions including a first shoulder land portion including the first tread edge, and a first middle land portion adjacent to the first shoulder land portion, the first shoulder land portion provided with a plurality of first shoulder sipes extending in a tire axial direction, the first middle land portion provided with a plurality of first middle sipes extending in the tire axial direction, each of the first shoulder sipes and the first middle sipes comprising a maim portion extending in a tire radial direction, and a widened portion opening at the tread surface of the land portion and having a width larger than that of the maim portion, and opening widths of the first shoulder sipes at the tread surface being larger than opening widths of the first middle sipes at the tread surface.

Effects of the Invention

By adopting the above configuration, the tire of the present disclosure can improve braking performance on dry road surfaces.

Figure 1:
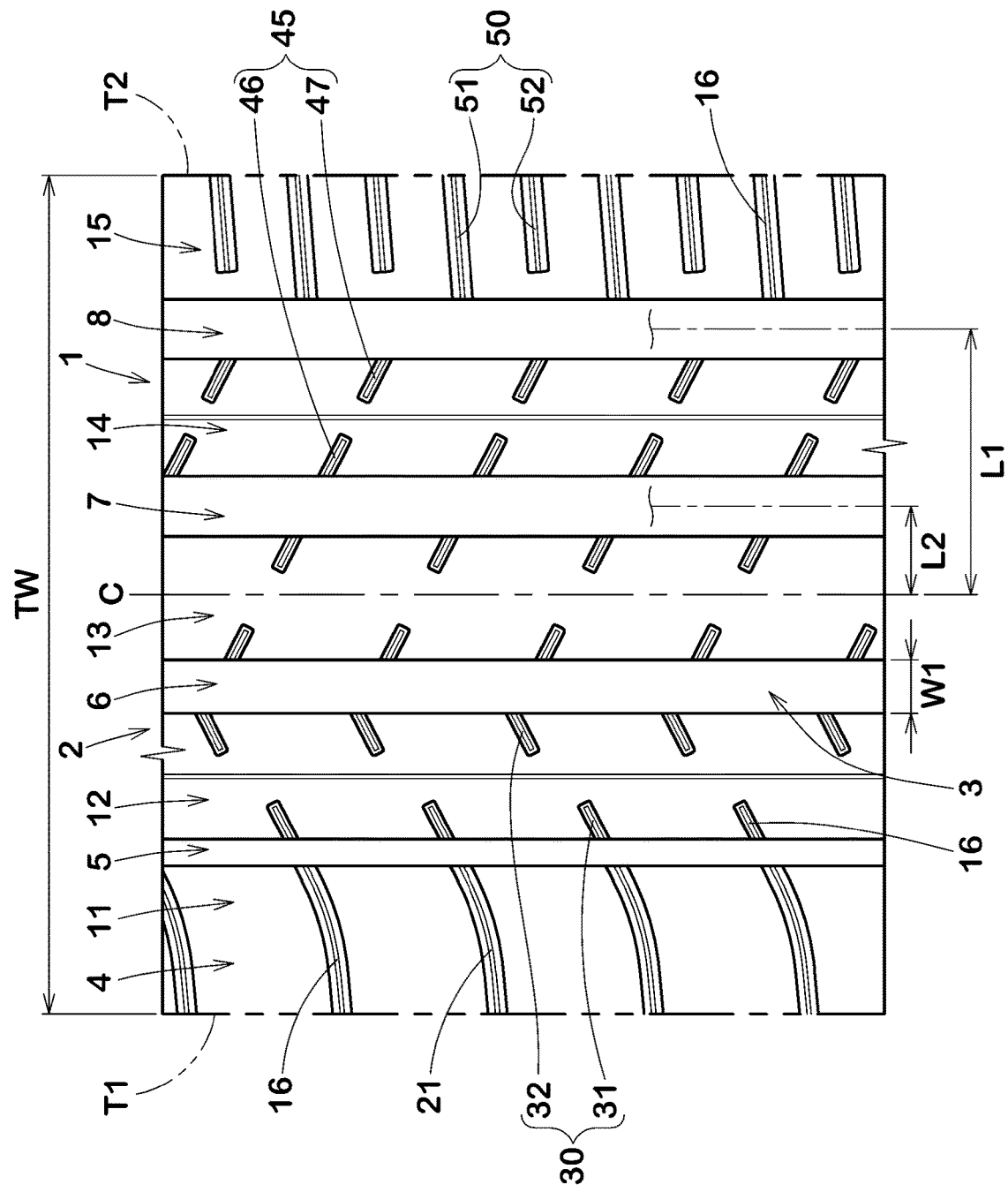
FIG. 1 is a developed view of a tread portion showing an embodiment of the present disclosure.

DESCRIPTION OF THE SIGNS 2 tread portion
3 circumferential groove
4 land portion
11 first shoulder land portion
12 first middle land portion
21 first shoulder sipe
30 first middle sipe
T1 first tread edge
T2 second tread edge

MODE FOR CARRYING OUT THE INVENTION

Hereinafter, an embodiment of the present disclosure will be described based on the drawings.

FIG. 1 is a developed view of a tread portion 2 of a tire 1 showing an embodiment of the present disclosure.

The tire 1 of the present embodiment is suitably used, for example, as a pneumatic tire for passenger cars.

However, the present disclosure is not limited to such embodiment, and may be applied to heavy-duty pneumatic tires and non-pneumatic tires not filled with pressurized air.

As shown in FIG. 1, the tire 1 of the present embodiment has, for example, a tread portion 2 for which its mounting direction to a vehicle is specified.

The tread portion 2 has a first tread edge T1 intended to be positioned on a vehicle outer side when the tire 1 is mounted on a vehicle, and a second tread edge T2 intended to be positioned on a vehicle inner side when the tire 1 is mounted on the vehicle.

The direction of attachment to a vehicle is indicated, for example, in a sidewall portion (not shown) by letters or symbols. The tire 1 of the present disclosure is however not limited to such embodiment, and may be one for which its mounting direction to the vehicle is not specified.

The first tread edge T1 and the second tread edge T2 correspond to the outermost contact positions in the tire axial direction when the tire 1 in a normal state contacts with a flat surface at a camber angle of 0 degrees and is loaded with 50% of a normal load.

In the case of a pneumatic tire for which various standards have been established, the "normal condition" means a state in which the tire is mounted on a normal rim, inflated to a normal internal pressure, and unloaded.

In the case of a tire for which various standards are not established or a non-pneumatic tire, the normal condition means a standard usage condition according to the purpose of use of the tire, which is a condition in which the tire is not attached to the vehicle and is not loaded.

In this specification, unless otherwise noted, the dimensions of each portion of the tire are the values measured in the normal condition.

Each configuration described in this specification allows for normal tolerances included in rubber moldings.

The "normal rim" means a rim defined for each tire by a standard in a standard system including the standard on which the tire is based, for example, "standard rim" in JATMA, "design rim" in TRA, and "measuring rim" in ETRTO.

The "normal internal pressure" means the air pressure defined for each tire by each standard in a standard system including the standard on which the tire is based, for example, "maximum air pressure" in JATMA, the maximum value listed in the table "TIRE LOAD LIMITS AT VARIOUS COLD INFLATION PRESSURES" in TRA, and "INFLATION PRESSURE" in ETRTO.

In the case of a pneumatic tire for which various standards have been established, the "normal load" means the load defined for each tire by each standard in a standard system including the standard on which the tire is based, for example, "maximum load capacity" in JATMA, the maximum value listed in the table "TIRE LOAD LIMITS AT VARIOUS COLD INFLATION PRESSURES" in TRA, and "LOAD CAPACITY" in ETRTO.

In the case of a tire for which various standards are not established or a non-pneumatic tire, the "normal load" means the load acting on one tire when the tire is in the standard mounting state. The "standard mounting state" means a state in which the tire is mounted on a standard vehicle according to the purpose of use of the tire, and the vehicle is standing still on a flat road surface in a drivable state.

The tread portion 2 has a plurality of circumferential grooves 3 extending continuously in the tire circumferential direction between the first tread edge T1 and the second tread edge T2, and a plurality of land portions 4 divided by the circumferential grooves 3.

The tire 1 of the present embodiment is configured as a so-called five-rib tire comprising five land portions 4 in which the tread portion 2 is divided by four circumferential grooves 3.

The circumferential grooves 3 include, for example, a first shoulder circumferential groove 5, a second shoulder circumferential groove 8, a first crown circumferential groove 6 and a second crown circumferential groove 7.

The first shoulder circumferential groove 5 is provided between the first tread edge T1 and the tire equator C.

The second shoulder circumferential groove 8 is provided between the second tread edge T2 and the tire equator C.

The first crown circumferential groove 6 is provided between the first shoulder circumferential groove 5 and the tire equator C. The second crown circumferential groove 7 is provided between the second shoulder circumferential groove 8 and the tire equator c.

It is preferable that a distance L1 in the tire axial direction from the tire equator C to the groove center line of the first shoulder circumferential groove 5 or the second shoulder circumferential groove 8 is 25% to 35% of a tread width TW, for example.

It is preferable that a distance L2 in the tire axial direction from the tire equator C to the groove center line of the first crown circumferential groove 6 or the second crown circumferential groove 7 is 5% to 15% of the tread width TW, for example.

The tread width TW is the distance in the tire axial direction from the first tread edge T1 to the second tread edge T2 under the normal state.

In the present embodiment, each circumferential groove 3 extends straight in parallel with the tire circumferential direction, for example.

Each circumferential groove 3 may extend in a wavy shape, for example.

It is desirable that the groove width w1 of each circumferential groove 3 is, for example, 2.0% to 8.0% of the tread width TW. In the present embodiment, the first shoulder circumferential groove 5 has a smallest groove width among the four circumferential grooves 3. However, the present disclosure is not limited to such embodiment.

In the case of pneumatic tires for passenger cars, it is desirable that the depth of each circumferential groove 3 is, for example, 5 to 10 mm.

The land portions 4 of the present disclosure include at least a first shoulder land portion 11 and a first middle land portion 12.

Further, the land portions 4 of the present embodiment include a second shoulder land portion 15, a second middle land portion 14 and a crown land portion 13.

The first shoulder land portion 11 includes first tread edge T1. The first middle land portion 12 is divided by the first shoulder circumferential groove 5 and the first crown circumferential groove 6, and is adjacent to the first shoulder land portion 11 on the second tread edge T2 side.

The second shoulder land portion 15 includes the second tread edge T2.

The second middle land portion 14 is divided by the second shoulder circumferential groove 8 and the second crown circumferential groove 7, and is adjacent to the second shoulder land portion 15 on the first tread edge T1 side.

The crown land portion 13 is defined between the first crown circumferential groove 6 and the second crown circumferential groove 7. Thereby, the crown land portion 13 is provided between the first middle land portion 12 and the second middle land portion 14.

The crown land portion 13 of the present embodiment is provided on the tire equator c.

Each land portion 4 of the present embodiment is provided with sipes 16.

In this specification, the "sipe" means a slit element having a small width wherein the width between the two inner walls facing each other is 1.5 mm or less. The width of the sipe is desirably 0.5 to 1.5 mm.

A widened portion having a width greater than 1.5 mm may be connected at the opening of the sipe.

A flask bottom having a width greater than 1.5 mm may be connected at the bottom of the sipe.

Figure 2:
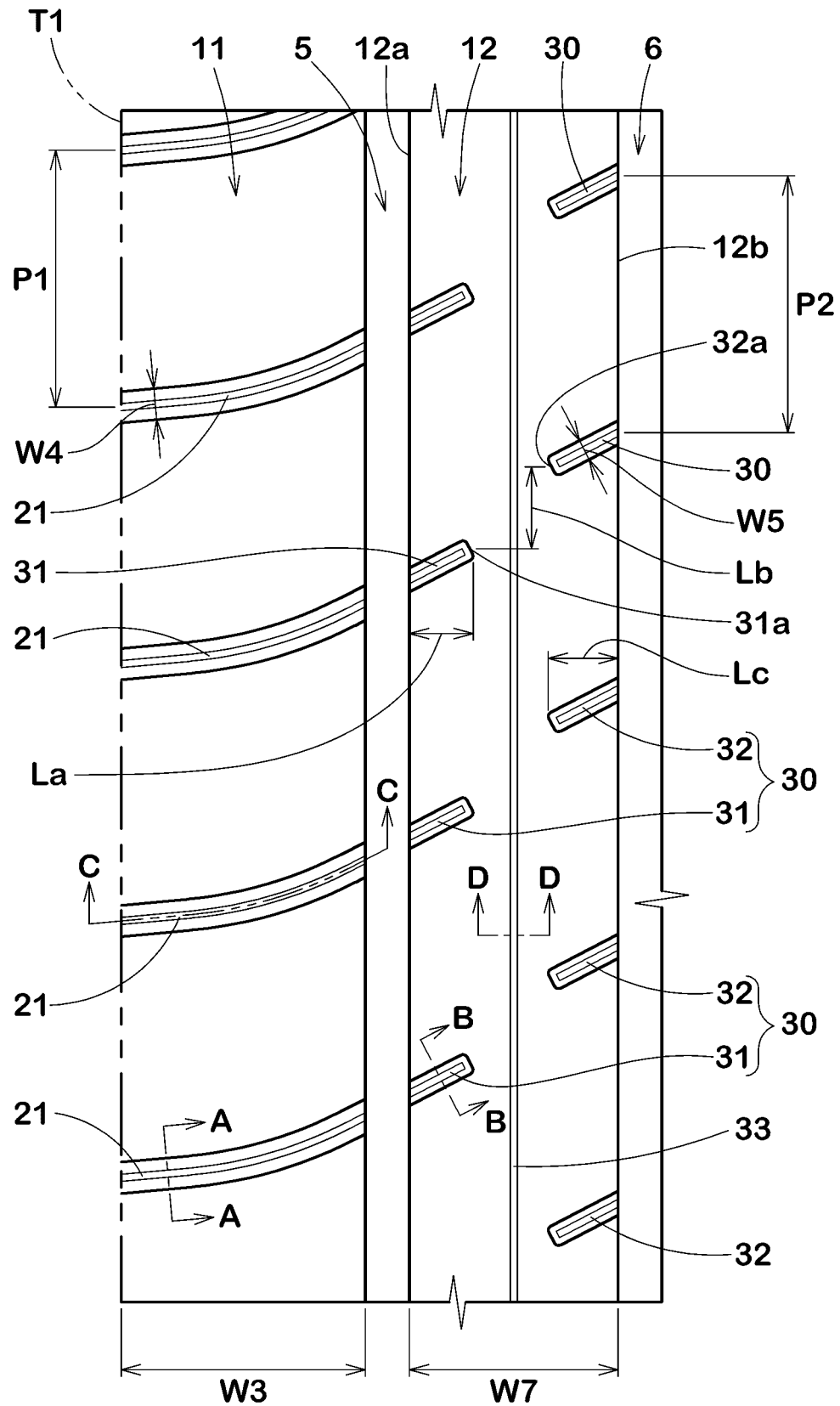
FIG. 2 is an enlarged view of a first shoulder land portion and a first middle land portion in FIG. 1.

In FIG. 2, there is shown an enlarged view of the first shoulder land portion 11 and the first middle land portion 12.

As shown in FIG. 2, the first shoulder land portion 11 is provided with a plurality of first shoulder sipes 21 extending in the tire axial direction.

The first middle land portion 12 is provided with a plurality of first middle sipes 30 extending in the tire axial direction.

Figure 3:
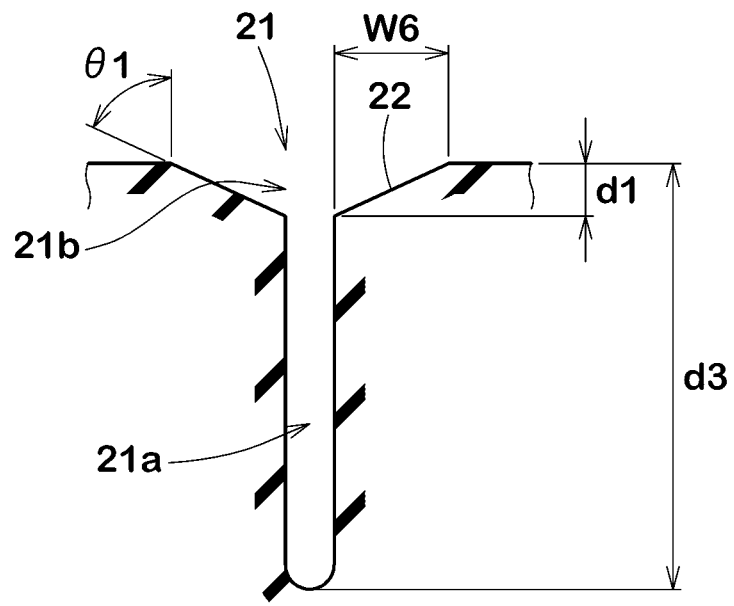
FIG. 3 is a cross-sectional view taken along line A-A of FIG. 2.

In FIG. 3, there is shown a cross-sectional view taken along line A-A of FIG. 2 as a cross-sectional view of the first shoulder sipe 21.

Figure 4:
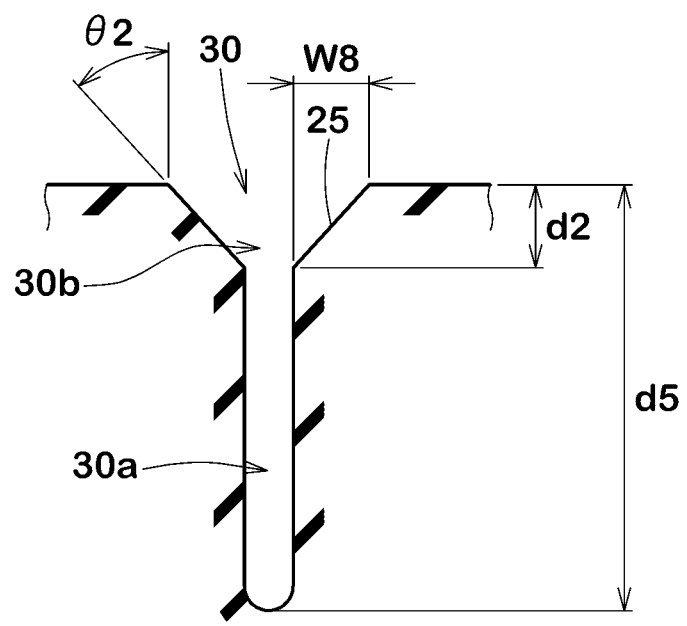
FIG. 4 is a cross-sectional view taken along line B-B of FIG. 2.

In FIG. 4, there is shown a cross-sectional view taken along line B-B of FIG. 2 as a cross-sectional view of the first middle sipe 30.

As shown in FIG. 3, the first shoulder sipe 21 comprises a maim portion 21a extending in the tire radial direction, and a widened portion 21b having a width greater than that of the maim portion 21a and opened at the tread surface of the land portion. Similarly, as shown in FIG. 4, the first middle sipe 30 comprises a maim portion 30a extending in the tire radial direction, and a widened portion 30b having a width greater than that of the maim portion 30a and opened at the tread surface of the land portion.

In the present embodiment, the widths of the main body portions are, for example, 0.5 to 1.5 mm.

As shown in FIG. 2, in the present disclosure, the opening width W4 of the first shoulder sipe 21 at the tread surface is larger than the opening width W5 of the first middle sipe 30 at the tread surface.

By adopting the above configurations, the tire of the present disclosure can exhibit excellent braking performance on dry road surfaces.

The reason for this is presumed to be the following mechanism.

In general, a sipe not provided with the above-described widened portion, is deformed so that a neighboring part of the sipe edge is lifted due to the deformation of the land portion, and as a result, the ground contact pressure around the sipe is locally reduced.

In the present disclosure, the inclusion of the widened portion in the sipe alleviates the deformation described above, making it easier for the entire tread surface of each land portion to evenly contact with the ground. Consequently, it is considered that braking performance on dry road surfaces is improved.

In addition, in the present disclosure, since the opening width W4 is larger than the opening width W5, the entire tread surface of the first shoulder land portion 11 is more likely to evenly contact with the ground, and the above-described effects are exhibited more reliably.

It is speculated that, due to the mechanism described above, the tire of the present disclosure can improve braking performance on dry road surfaces.

Hereinafter, more detailed configurations of the present embodiment will be described.

Each configuration described below represents a specific aspect of the present embodiment. Therefore, it goes without saying that the present disclosure can exhibit the above effects even if it does not have the configurations described below.

Further, even if any one of the configurations described below is applied alone to the tire of the present disclosure having the features described above, an improvement in performance according to the respective configuration can be expected. Furthermore, when some of the respective configurations described below are applied in combination, it is possible to expect a combined improvement in performance according to the respective configurations.

Figure 5:
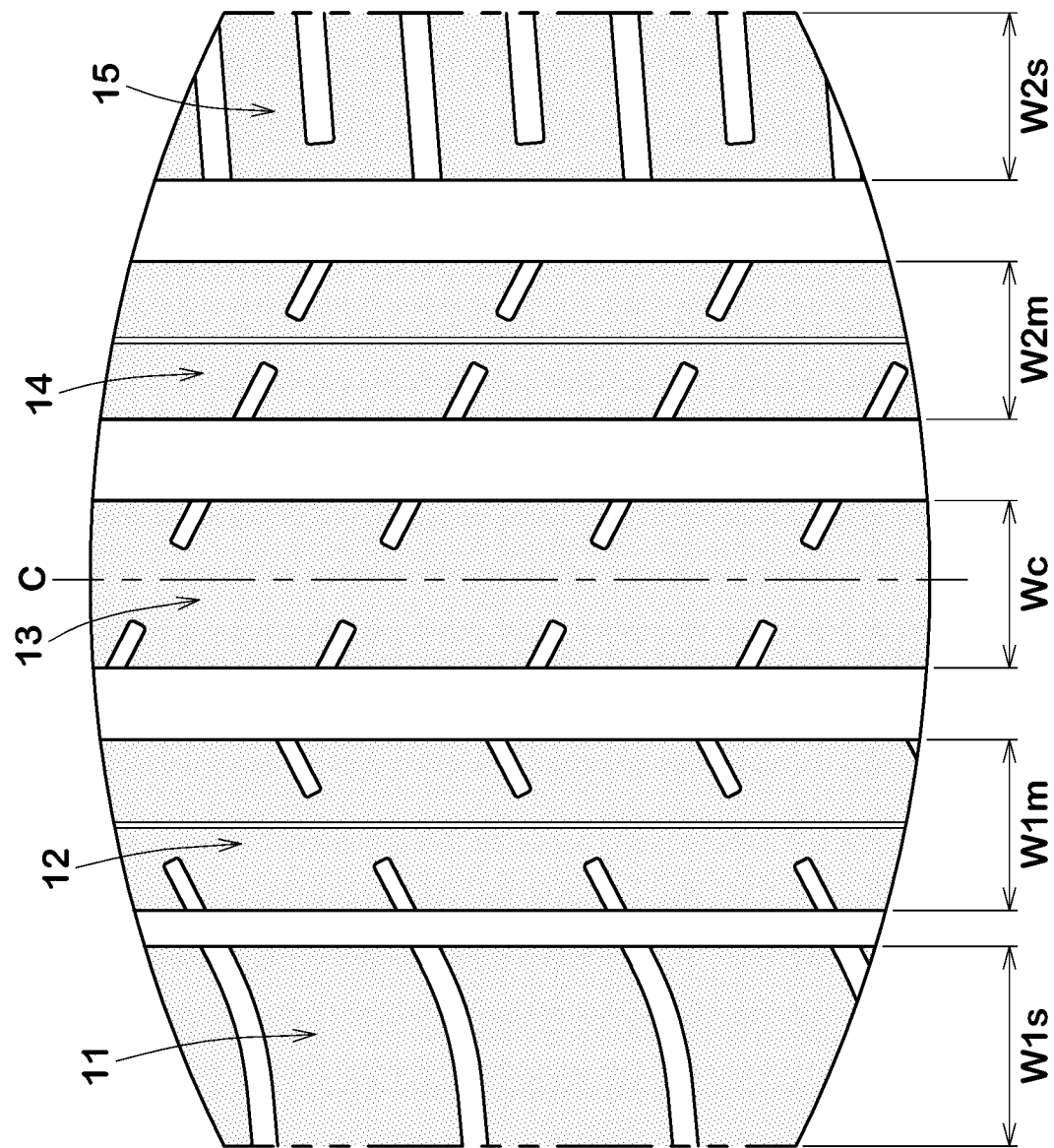
FIG. 5 is an enlarged view showing a shape of a contact surface of the tread portion when contacting with a ground.

In FIG. 5, there is shown an enlarged view showing the shape of a contact surface of the tread portion 2 when contacting a ground.

Given that, as shown in FIG. 5, the widths in the tire axial direction of the ground contacting surfaces of the first shoulder land portion 11, the first middle land portion 12, the crown land portion 13, the second middle land portion 14, and the second shoulder land portion 15 are W1s, W1m, Wc, W2m, and W2s, respectively, in a 50% load state in which the tire mounted on a normal rim with a regular internal pressure, is contacted with a flat surface at a camber angle of 0 degrees and the tire is applied with 50% of the normal load, it is desirable to satisfy the following expression (1).

Further, the tire 1 of the present embodiment also satisfies the following expression (2) as a more desirable mode.

In such tire 1, the land portion near the first tread edge T1 has greater rigidity. Consequently, even when the center of the contact patch shifts toward the first tread edge T1 due to steering, the steering response is still stable, and the generation of the cornering force is linear with respect to the increase in the steering angle. Therefore, braking performance on dry road surfaces (hereinafter sometimes simply referred to as "brake performance") is improved, and excellent steering stability and ride comfort cna be obtained.

$$W1m > Wc > W2m \qquad (1)$$

$$W1s > W1m > Wc > W2m >= W2s \qquad (2)$$

In the 50% load state, it is desirable that the width W1s in the tire axial direction of the ground contacting surface of the first shoulder land portion 11 is 115% to 125% of the width Wc in the tire axial direction of the ground contacting surface of the crown land portion 13. Thereby, the rigidity of the first shoulder land portion 11 is optimized, and noise performance can be improved together with the effects described above.

From a similar point of view, it is desirable that, in the 50% load state, the width W1m in the tire axial direction of the ground contacting surface of the first middle land portion 12 is 101% to 107% of the width Wc in the tire axial direction of the ground contacting surface of the crown land portion 13.

In the 50% load state, it is desirable that the width W2m in the tire axial direction of the ground contacting surface of the second middle land portion 14 is 90% to 99% of the width Wc in the tire axial direction of the ground contacting surface of the crown land portion 13. Thereby, the noise performance during running straight is improved. Further, the vibration of the tire during straight running is less likely to be transmitted to the vehicle body side, and the ride comfort is improved.

From a similar point of view, it is desirable that, in the 50% load state, the width w2s in the tire axial direction of the ground contacting surface of the second shoulder land portion 15 is 90% to 99% of the width Wc in the tire axial direction of the ground contacting surface of the crown land portion 13.

In the present embodiment, as a more desirable mode, in the 50% load state, the width W2m of the second middle land portion 14 is the same as the width w2s of the second shoulder land portion 15. Thereby, the progress of wear of the second middle land portion 14 and the second shoulder land portion 15 becomes uniform, and the uneven wear resistance performance is improved.

As shown in FIG. 2, the first shoulder land portion 11 is provided with only sipes. Thereby, the rigidity of the first shoulder land portion 11 is increased.

One pitch length P1 in the tire circumferential direction of the first shoulder sipes 21 is, for example, 100% to 130% c of the width w3 in the tire axial direction of the first shoulder land portion 11 (the width of the ground contacting surface in the normal state, the same applies hereinafter).

One pitch length in the tire circumferential direction of the two sipes is the distance from the widthwise center position of the cross section of one of the sipes to the center position of the other of the sipes in parallel with the tire circumferential direction. Further, when the distance changes in the tire axial direction, the intermediate distance corresponds to the one pitch length.

It is desirable that the first shoulder sipes 21 communicate with at least the first shoulder circumferential groove 5. The first shoulder sipes 21 of the present embodiment extend, for example, from the first shoulder circumferential groove 5 to the first tread edge T1, and completely crosses the ground contacting surface of the first shoulder land portion 11. However, the first shoulder sipe 21 is not limited to such mode, and may have an end terminated within the first shoulder land portion 11.

The first shoulder sipes 21 are, for example, inclined with respect to the tire axial direction toward a first direction (upward to the right in each drawing of this specification). The angles of the first shoulder sipes 21 with respect to the tire axial direction are, for example, 5 to 35 degrees. In a more desirable mode, the first shoulder sipe 21 comprises a portion whose angle with respect to the tire axial direction increases toward the second tread edge T2.

Such first shoulder sipe 21 can exert a frictional force in the tire axial direction too.

The opening width W4 of the first shoulder sipe 21 is, for example, 4.0 to 8.0 mm. The opening width W5 of the first middle sipe 30 is, for example, 2.0 to 6.0 mm. The opening width W5 of the first middle sipe 30 is 50% to 90% of the opening width W4 of the first shoulder sipe 21. Such first shoulder sipe 21 and first middle sipe 30 can improve uneven wear resistance together with the effects described above.

It is desirable that the total of the opening areas of the first shoulder sipes 21 provided in the first shoulder land portion 11 is 24% to 49% of the ground contact area of the first shoulder land portion 11.

As shown in FIG. 3, the widened portion 21b of the first shoulder sipe 21 comprises an inclined surface 22 extending from the maim portion 21a to the tread surface. The inclined surface 22 of the present embodiment is flat and inclined at an angle θ1 of 50 to 70 degrees with respect to the tire radial direction. Such widened portion 21b allows the entire surface of the inclined surface 22 to contact with the ground when a large ground contact pressure acts on the land portion, thereby reliably increasing the substantial contact area of the tread portion. Therefore, braking performance is further improved.

The depth d1 of the widened portion 21b of the first shoulder sipe 21 is 10% to 30% of the maximum depth d3 of the first shoulder sipe 21, and set to 0.5 to 2.0 mm in a desirable mode. The maximum depth d3 of the first shoulder sipe 21 is set to 70% to 100% of the depth of the circumferential groove 3, for example.

In a more desirable mode, the depth d1 of the widened portion 21b of the first shoulder sipe 21 is smaller than the depth d2 (shown in FIG. 4) of the widened portion 30b of the first middle sipe 30. Thereby, the rigidity of the first shoulder land portion 11 is maintained, and a large cornering force can be expected while exhibiting the above-described effects.

The depth d1 of the widened portion 21b of the first shoulder sipe 21 is 50% to 90%, preferably 60% to 80% of the depth d2 of the widened portion 30b of the first middle sipe 30.

The width w6 of the widened portion 21b of the first shoulder sipe 21 (the width along the tread surface in the cross section of the sipe) is, for example, 2.0 to 4.0 mm.

Figure 6:
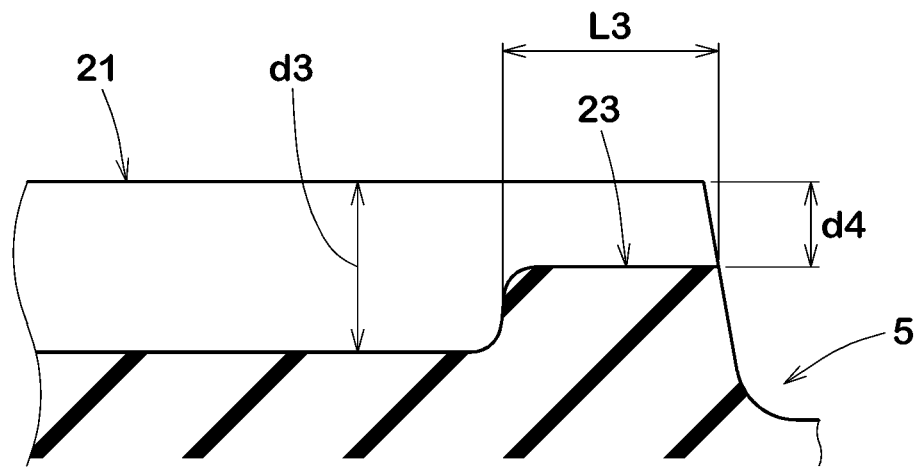
FIG. 6 is a cross-sectional view taken along line C-C of FIG. 2.

In FIG. 6, there is shown a cross-sectional view taken along line C-C of FIG. 2.

As shown in FIG. 6, the first shoulder sipe 21 comprises a shallow bottom portion 23 where the bottom is locally raised. The shallow bottom portion 23 of the present embodiment is disposed, for example, in a communicating portion with the first shoulder circumferential groove 5.

The minimum depth d4 of the shallow bottom portion 23 of the first shoulder sipe 21 is 40% to 60% of the maximum depth d3 of the first shoulder sipe 21.

The length L3 in the tire axial direction of the shallow bottom portion 23 is 10% to 30% of the width w3 (shown in FIG. 2) in the tire axial direction of the first shoulder land portion 11. The length L3 of the shallow bottom portion 23 is measured, for example, at the center position in the height direction of the shallow bottom portion 23.

The first shoulder sipes 21 having such shallow bottom portions 23 maintain the rigidity of the first shoulder land portion 11 and improves braking performance.

As shown in FIG. 2, the first middle land portion 12 comprises a first longitudinal edge 12a on the first tread edge T1 side, a second longitudinal edge 12b on the second tread edge T2 side, and a tread surface between the first longitudinal edge 12a and the second longitudinal edge 12b.

The first middle land portion 12 is provided with only sipes. Thereby, the rigidity of the first middle land portion 12 is increased.

The first middle sipes 30 include an outside first middle sipe 31 extending from the first longitudinal edge 12a and having a terminal end 31a within the first middle land portion 12, and an inside first middle sipe 32 extending from the second longitudinal edge 12b and having a terminal end 32a within the first middle land portion 12.

The first middle sipe 30 extends linearly in a tread plan view. Further, the first middle sipe 30 is inclined with respect to the tire axial direction toward the first direction. More specifically, each of the outside first middle sipe 31 and the inside first middle sipe 32 extends linearly in the tread plan view and is inclined with respect to the tire axial direction toward the first direction.

The angle of the outside first middle sipe 31 with respect to the tire axial direction and the angle of the inside first middle sipe 32 with respect to the tire axial direction are each preferably not less than 20 degrees, more preferably not less than 25 degrees, but preferably not more than 45 degrees, more preferably not more than 40 degrees. Such outside first middle sipe 31 and inside first middle sipe 32 provide frictional forces in the tire axial direction and tire circumferential direction in a well-balanced manner.

The angle difference between the outside first middle sipe 31 and the inside first middle sipe 32 is preferably not more than 10 degrees, more preferably not more than 5 degrees, and in the present embodiment they are parallely arranged.

Such outside first middle sipe 31 and inside first middle sipe 32 can suppress uneven wear of the first middle land portion 12.

Each of the outside first middle sipe 31 and the inside first middle sipe 32 is terminated without extending across the center position in the tire axial direction of the first middle land portion 12.

The length La in the tire axial direction of the outside first middle sipe 31 is not less than 20%, more preferably not less than 25%, but preferably not more than 45%, more preferably not more than 40% of the width w7 in the tire axial direction of the first middle land portion 12.

Similarly, the length Lc in the tire axial direction of the inside first middle sipe 32 is not less than 20%, more preferably not less than 25%, but preferably not more than 45%, more preferably not more than 40% of the width w7 in the tire axial direction of the first middle land portion 12.

Such outside first middle sipe 31 and inside first middle sipe 32 can improve ride comfort and noise performance while maintaining braking performance.

It is desirable that the outside first middle sipe 31 and the inside first middle sipe 32 are shifted from each other in the tire circumferential direction. Thereby, in the present embodiment, an imaginary region obtained by extending the outside first middle sipe 31 parallel to the tire axial direction does not overlap with the inside first middle sipe 32 in the tread plan view. Further, the terminal end 31a of the outside first middle sipe 31 and the terminal end 32a of the inside first middle sipe 32 are shifted from each other in the tire circumferential direction. The distance Lb in the tire circumferential direction between the terminal end 31a of the outside first middle sipe 31 and the terminal end 32a of the inside first middle sipe 32 is, for example, not more than 50%, preferably 25% to 40% of one pitch length P2 in the tire circumferential direction of the first middle sipes 30.

In a more desirable mode, the distance Lb is within a range of the following expression (3). Thereby, the pitch sound of each sipe easily becomes white noise, and the noise performance is improved.

$$Lb = 2La + / - 1 \text{ (mm)} \quad (3)$$

The one pitch length P2 of the first middle sipes 30 is, for example, 80% to 120% of the one pitch length P1 of the first shoulder sipes 21, and they are the same in a more desirable mode.

In the present embodiment, the outer first middle sipes 31 communicate with the first shoulder circumferential groove 5. In addition, in the tread plan view, the widened portion of the outside first middle sipe 31 overlaps with an area obtained by extending the widened portion 21b of the first shoulder sipe 21 along its longitudinal direction. Thereby, the outside first middle sipe 31 and the first shoulder sipe 21 cooperate to further improve the wet performance.

The first middle sipe 30 has a constant depth along its longitudinal direction. More specifically, each of the outside first middle sipe 31 and the inside first middle sipe 32 has a constant depth along its longitudinal direction.

The depth of the inside first middle sipe 32 is, for example, set to 70% to 100% of the depth of the circumferential groove 3. Further, the maximum depth of the outside first middle sipe 31 is smaller than the maximum depth of the inside first middle sipe 32.

The maximum depth of the outside first middle sipe 31 is 30% to 70% of the maximum depth of the inside first middle sipe 32, and set to 1.0 to 2.5 mm in a more desirable mode.

The cross-sectional shape of the sipe shown in FIG. 4 can be applied to each of the outside first middle sipe 31 and the inside first middle sipe 32. Such outside first middle sipe 31 and inside first middle sipe 32 convert the pitch sound of each sipe into white noise to improve noise performance, and improve ride comfort and steering stability in a well-balanced manner.

As shown in FIG. 4, the widened portion 30b of the first middle sipe 30 comprises an inclined surface 25 extending from the maim portion 30a to the tread surface.

The inclined surface 25 of the present embodiment is flat and inclined at an angle θ2 of 30 to 60 degrees with respect to the tire radial direction.

The depth d2 of the widened portion 30b of the first middle sipe 30 is 15% to 30% of the maximum depth d5 of the first middle sipe 30. The depth d2 of the widened portion 30b of the first middle sipe 30 is, for example, 1.0 to 3.0 mm.

The width w8 of the widened portion 30b of the first middle sipe 30 (the width along the tread surface in the cross section of the sipe) is, for example, 1.0 to 3.0 mm.

It is desirable that, as shown in FIG. 2, the total of the opening areas of the respective first middle sipes 30 provided in the first middle land portion 12 is 4% to 14% of the ground contact area of the first middle land portion 12.

The first middle land portion 12 is provided with, for example, a first longitudinal sipe 33 extending in the tire circumferential direction.

The first longitudinal sipe 33 of the present embodiment extends continuously in the tire circumferential direction.

Such first longitudinal sipe 33 provides a frictional force in the tire axial direction during wet running.

The first longitudinal sipe 33 is, for example, disposed in the central part when the first middle land portion 12 is divided into three equal parts in the tire axial direction.

The distance in the tire axial direction from the first longitudinal sipe 33 to the center position in the tire axial direction of the first middle land portion 12 is preferably not more than 10%, more preferably not more than 5% of the width w7 in the tire axial direction of the first middle land portion 12. Such arrangement of the first longitudinal sipe 33 can suppress uneven wear of the first middle land portion 12.

Figure 7:
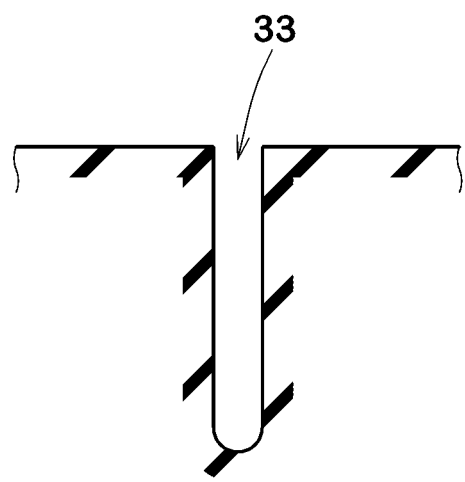
FIG. 7 is a cross-sectional view taken along line D-D of FIG. 2.

In FIG. 7, there is shown a cross-sectional view taken along line D-D of FIG. 2.

As shown in FIG. 7, the first longitudinal sipe 33 has a constant width from the open end toward the bottom, for example.

Figure 8:
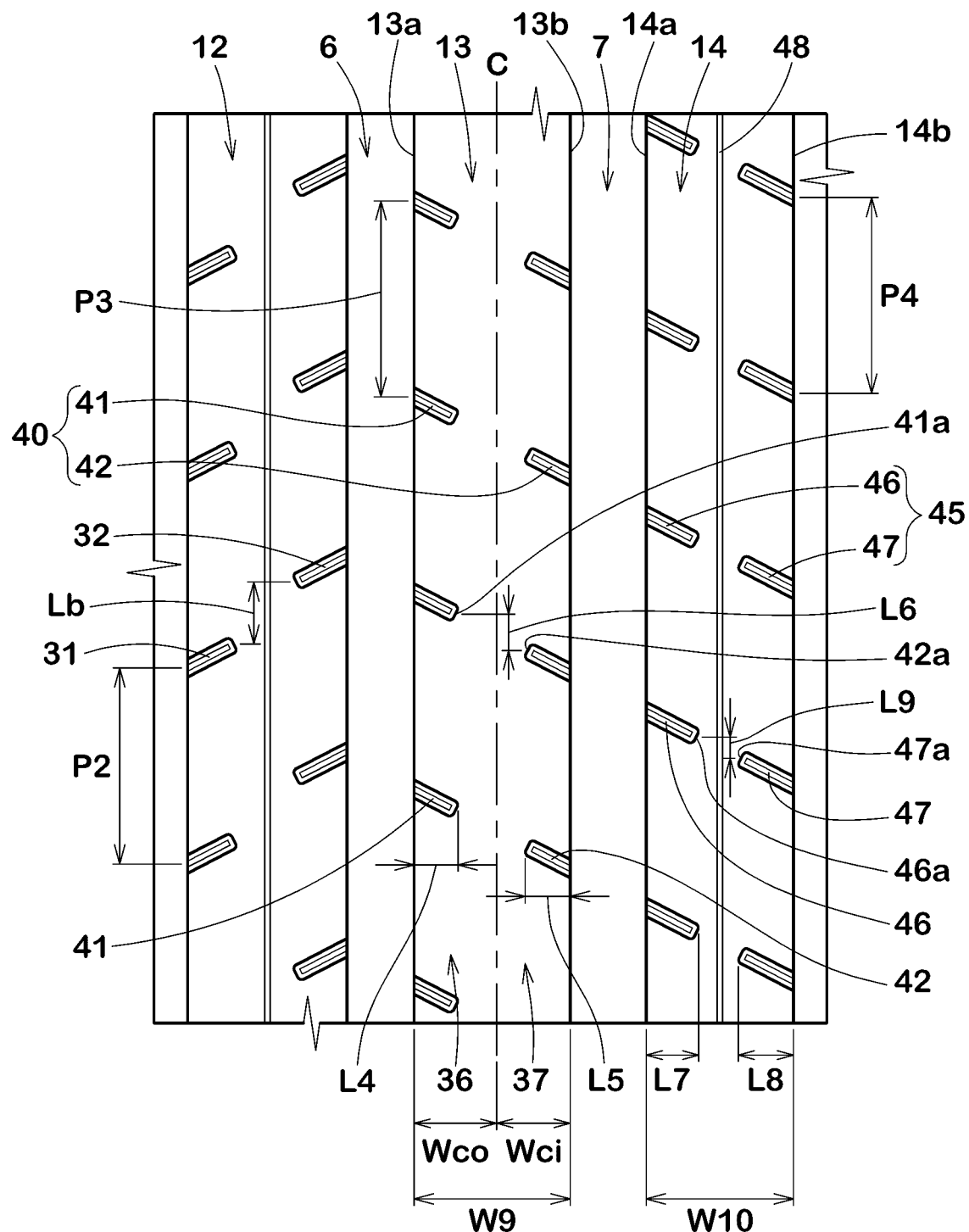
FIG. 8 is an enlarged view of the first middle land portion, a crown land portion and a second middle land portion in FIG. 1.

In FIG. 8, there is shown an enlarged view of the first middle land portion 12, the crown land portion 13 and the second middle land portion 14.

As shown in FIG. 8, the crown land portion 13 comprises a first longitudinal edge 13a on the first tread edge T1 side, a second longitudinal edge 13b on the second tread edge T2 side, and a tread surface between the first longitudinal edge 13a and the second longitudinal edge 13b.

Similarly, the second middle land portion 14 comprises a first longitudinal edge 14a on the first tread edge T1 side, a second longitudinal edge 14b on the second tread edge T2 side, and a tread surface between the first longitudinal edge 14a and the second longitudinal edge 14b.

The crown land portion 13 comprises an outside ground-contacting surface 36 on the first tread edge T1 side of the tire equator C, and an inside ground-contacting surface 37 on the second tread edge T2 side of the tire equator C.

In the present embodiment, when the axial widths of the outside ground-contacting surface 36 and the inside ground-contacting surface 37 are Wco and Wci, respectively, the following expression (4) is satisfied. Such crown land portion 13 serves to enhance steering stability.

$$Wco > Wci \qquad (4)$$

The width Wco in the tire axial direction of the outside ground-contacting surface 36 is, for example, 51% to 60%, preferably 51% to 55% of the width w9 in the tire axial direction of the ground contacting surface of the crown land portion 13. Thereby, steering stability is improved, while suppressing uneven wear of the crown land portion 13.

The crown land portion 13 is provided with sipes only. Thereby, the rigidity of the crown land portion 13 is increased.

The crown land portion 13 is provided with a plurality of crown sipes 40 inclined with respect to the tire axial direction to a second direction opposite to the first direction (downward to the right in each figure of this specification).

The crown sipe 40 of the present embodiment extends linearly while inclining toward the second direction.

Such crown sipe 40 cooperates with the first middle sipe 30 to provide multi-directional frictional forces and improve wet performance.

One pitch length P3 in the tire circumferential direction of the crown sipes 40 is, for example, 80% to 120% of the one pitch length P2 in the tire circumferential direction (shown in FIG. 2) of the first middle sipes 30, and in the present embodiment, they are the same. Such sipe arrangement improves uneven wear resistance.

The angle of the crown sipe 40 with respect to the tire axial direction is preferably not less than 20 degrees, more preferably not less than 25 degrees, but preferably not more than 45 degrees, more preferably not more than 40 degrees. The crown sipes 40 provide frictional forces in the tire circumferential direction and the tire axial direction in a well-balanced manner.

The crown sipes 40 include an outside crown sipe 41 extending from a first longitudinal edge 40*a* and having a terminal end 41*a* within the crown land portion 13, and an inside crown sipe 42 extending from a second longitudinal edge 40*b* and having a terminal end 42*a* within the crown land portion 13.

The angular difference between the outside crown sipe 41 and the inside crown sipe 42 is preferably not more than 10 degrees, more preferably not more than 5 degrees, and in the present embodiment, they are parallely arranged.

Such outside crown sipe 41 and inside crown sipe 42 suppress uneven wear of the crown land portion 13.

Each of the outside crown sipe 41 and the inside crown sipe 42 is terminated, without extending across the center position in the tire axial direction of the crown land portion 13.

The length L4 in the tire axial direction of the outside crown sipe 41 and the length L5 in the tire axial direction of the inside crown sipe 42 are, for example, 20% to 35% of the width w9 in the tire axial direction of the crown land portion 13. Such outside crown sipe 41 and inside crown sipe 42 improve braking performance and ride comfort in a well-balanced manner.

It is desirable that the outside crown sipe 41 and the inside crown sipe 42 are shifted from each other in the tire circumferential direction. Thereby, in the present embodiment, in the tread plan view, a virtual region formed by extending the outside crown sipe 41 parallel to the tire axial direction does not overlap with the inside crown sipe 42. Further, the terminal end 41*a* of the outside crown sipe 41 and the terminal end 42*a* of the inside crown sipe 42 are shifted from each other in the tire circumferential direction.

It is desirable that the distance L6 in the tire circumferential direction between the terminal end 41*a* of the outside crown sipe 41 and the terminal end 42*a* of the inside crown sipe 42 is, for example, smaller than the distance Lb in the tire circumferential direction between the terminal end 31*a* of the outside first middle sipe 31 and the terminal end 32*a* of the inside first middle sipe 32. Specifically, the distance L6 is preferably not more than 70%, more preferably not more than 60%, but preferably not less than 30%, more preferably not less than 40% of the distance Lb. Such sipe arrangement converts the pitch sound of each sipe into white noise, and improves noise performance.

Each of the outside crown sipe 41 and inside crown sipe 42 has a constant depth along its longitudinal direction.

The depth of the inside crown sipe 42 is, for example, set to 70% to 100% of the depth of the circumferential groove 3. The maximum depth of the outside crown sipe 41 is less than the maximum depth of the inside crown sipe 42.

The maximum depth of the outside crown sipe 41 is 30% to 70% of the maximum depth of the inside crown sipe 42, and 1.0 to 2.5 mm in a desirable mode.

The cross-sectional configuration of the first middle sipe 30 described in FIG. 4 can be applied to each of the outside crown sipe 41 and the inside crown sipe 42. Therefore, the description is omitted here.

It is desirable that the total of the opening areas of the crown sipes 40 disposed in the crown land portion 13 is 4% to 14% of the ground contact area of the crown land portion 13.

The second middle land portion 14 is provided with sipes only. Thereby, the rigidity of the second middle land portion 14 is increased.

The second middle land portion 14 is provided with a plurality of second middle sipes 45 inclined with respect to the tire axial direction to the second direction. The second middle sipe 45 of the present embodiment extends linearly while inclining to the second direction.

One pitch length P4 in the tire circumferential direction of the second middle sipes 45 is, for example, 80% to 120% of the one pitch length P3 in the tire circumferential direction of the crown sipes 40. Such sipe arrangement improves uneven wear resistance.

The angle of the second middle sipe 45 with respect to the tire axial direction is preferably not less than 20 degrees, more preferably not less than 25 degrees, but preferably not more than 45 degrees, more preferably not more than 40 degrees. The crown sipe 40 provides frictional forces in the tire circumferential direction and the tire axial direction in a well-balanced manner.

The second middle sipes 45 include an outside second middle sipe 46 extending from the first longitudinal edge 14*a* and having a terminal end 46*a* within the crown land portion 13, and an inside second middle sipe 47 extending from the second longitudinal edge 14*b* and having a terminal end 47*a* within the crown land portion 13.

The angle difference between the outside second middle sipe 46 and the inside second middle sipe 47 is preferably not more than 10 degrees, more preferably not more than 5 degrees, and in the present embodiment, they are parallely arranged. Such outside second middle sipe 46 and inside second middle sipe 47 suppress uneven wear of the second middle land portion 14.

Each of the outside second middle sipe 46 and the inside second middle sipe 47 is terminated without extending across the center position in the tire axial direction of the second middle land portion 14.

The length L7 in the tire axial direction of the outside second middle sipe 46 and the length L8 in the tire axial direction of the inside second middle sipe 47 are, for example, larger than the length L4 of the outside crown sipe 41 and the length L5 of the inside crown sipe 42. Specifically, the length L7 of the outside second middle sipe 46 and the length L8 of the inside second middle sipe 47 are 25% to 35% of the width w10 in the tire axial direction of the second middle land portion 14. Such outside second middle sipe 46 and inside second middle sipe 47 help to improve wet performance and ride comfort.

It is desirable that the outside second middle sipe 46 and the inside second middle sipe 47 are shifted from each other in the tire circumferential direction. Thereby, in the present embodiment, in the tread plan view, an overlapping area between an imaginary region obtained by extending the outside second middle sipe 46 parallel to the tire axial direction and the inside second middle sipe 47 is not more than 10% of the opening area of the inside second middle sipe 47.

Further, the terminal end 46a of the outside second middle sipe 46 and the terminal end 47a of the inside second middle sipe 47 are shifted from each other in the tire circumferential direction. The distance L9 in the tire circumferential direction between the terminal end 46a of the outside second middle sipe 46 and the terminal end 47a of the inside second middle sipe 47 is, for example, smaller than the distance Lb (shown in FIG. 2) in the tire circumferential direction between the terminal end 31a of the outside first middle sipe 31 and the terminal end 32a of the inside first middle sipe 32, and preferably smaller than the distance L6 in the tire circumferential direction between the terminal end 41a of the outside crown sipe 41 and the terminal end 42a of the inside crown sipe 42. Specifically, the distance L9 is preferably not more than 80%, more preferably not more than 70%, but preferably not less than 40%, more preferably not less than 50% of the distance L6. Such sipe arrangement optimizes the rigidity balance in each land portion, and improves steering stability and ride comfort in a well-balanced manner.

Each of the outside second middle sipe 46 and the inside second middle sipe 47 has a constant depth in its longitudinal direction. The depth of the inside second middle sipe 47 is, for example, set to 70% to 100% of the depth of the circumferential groove 3. The maximum depth of the outside second middle sipe 46 is smaller than the maximum depth of the inside second middle sipe 47. The maximum depth of the outside second middle sipe 46 is 30% to 70% of the maximum depth of the inside second middle sipe 47, and 1.0 to 2.5 mm in a desirable mode. Such outside second middle sipe 46 and inside second middle sipe 47 convert the pitch sound of each sipe into white noise to improve noise performance, and improve ride comfort and steering stability in a well-balanced manner.

The cross-sectional configuration of the first middle sipe 30 described in FIG. 4 can be applied to each of the outside second middle sipe 46 and the inside second middle sipe 47. Therefore, the description is omitted here.

It is desirable that the total of the opening areas of the second middle sipes 45 disposed in the second middle land portion 14 is 4% to 14% of the ground contact area of the second middle land portion 14.

The second middle land portion 14 is provided with, for example, a second longitudinal sipe 48 extending in the tire circumferential direction.

The second longitudinal sipe 48 of the present embodiment extends continuously in the tire circumferential direction. The second longitudinal sipe 48 has the same cross-sectional shape as the first longitudinal sipe 33 described above. Such second longitudinal sipe 48 provides a frictional force in the tire axial direction.

The second longitudinal sipe 48 is provided, for example, in the central part when the second middle land portion 14 is divided into three equal parts in the tire axial direction.

The distance in the tire axial direction from the second longitudinal sipe 48 to the center position in the tire axial direction of the second middle land portion 14 is preferably not more than 10% more preferably not more than 5% of the width w10 in the tire axial direction of the second middle land portion 14.

Figure 9:
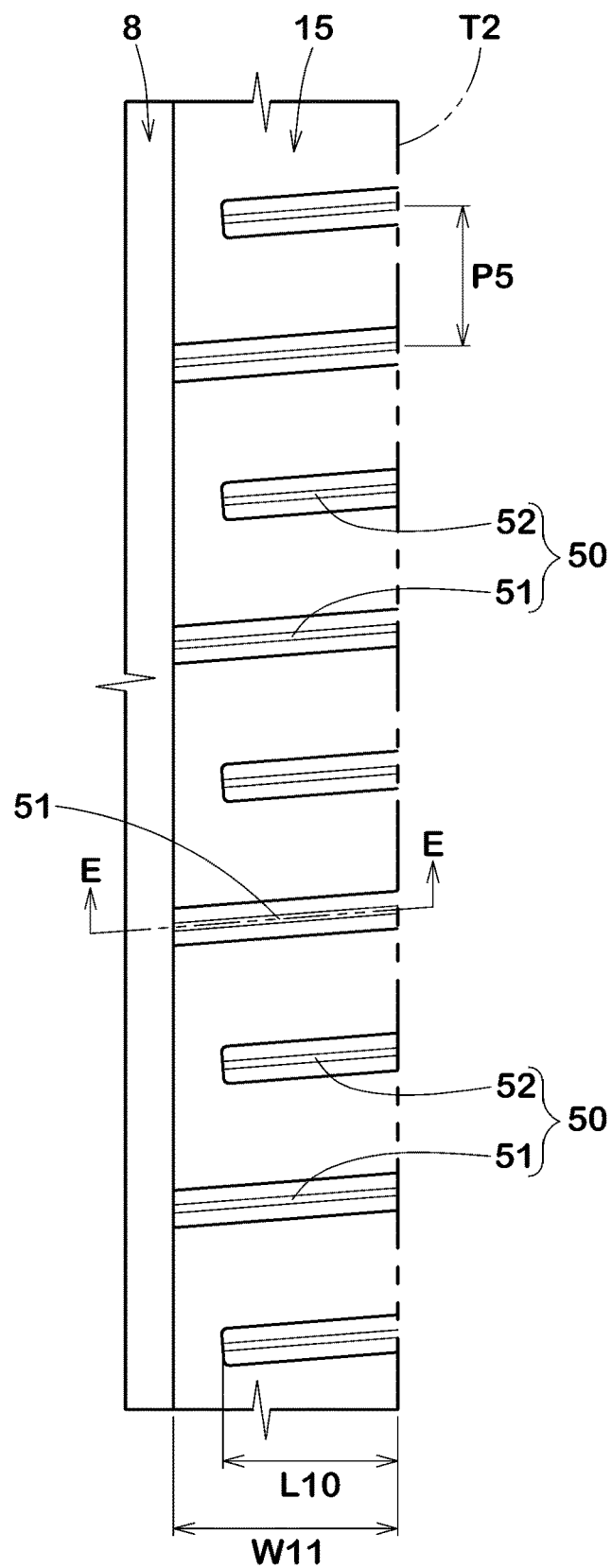
FIG. 9 is an enlarged view of a second shoulder land portion in FIG. 1.

In FIG. 9, there is shown an enlarged view of the second shoulder land portion 15 of FIG. 2.

As shown in FIG. 9, the second shoulder land portion 15 is provided with sipes only. Thereby, the rigidity of the second middle land portion 14 is increased.

The second shoulder land portion 15 is provided with, for example, a plurality of second shoulder sipes 50 extending in the tire axial direction. In the present embodiment, the total number of the second shoulder sipes 50 is larger than the total number of the first shoulder sipes 21 (shown in FIG. 2, the same applies hereinafter). Such sipe arrangement improves noise performance and wet performance.

In order to improve noise performance and wet performance while maintaining steering stability, the total number of the second shoulder sipes 50 is preferably not less than 1.3 times, more preferably not less than 1.5 times, still more preferably not less than 1.8 times, but preferably not more than 2.8 times, more preferably not more than 2.5 times, still more preferably not more than 2.2 times the total number of the first shoulder sipes 21.

One pitch length P5 in the tire circumferential direction of the second shoulder sipes 50 is, for example, 30% to 70% of the one pitch length P4 in the tire circumferential direction of the second middle sipe 45 (shown in FIG. 8).

The second shoulder sipe 50 is, for example, inclined to the first direction. That is, the first shoulder sipe 21 and the second shoulder sipe 50 are inclined to the same direction with respect to the tire axial direction. The second shoulder sipe 50 of the present embodiment extends linearly while inclining to the first direction.

The angle of the second shoulder sipe 50 with respect to the tire axial direction is, for example, not more than 20 degrees, preferably not more than 15 degrees, more preferably not more than 10 degrees. Thereby, in the present embodiment, the maximum angle of the first shoulder sipe 21 with respect to the tire axial direction is larger than the maximum angle of the second shoulder sipe 50 with respect to the tire axial direction. Such sipe arrangement further improves braking performance.

The configuration of the cross-sectional shape of the first shoulder sipe 21 described with reference to FIG. 3 can be applied to the second shoulder sipe 50. Therefore, the description is omitted here.

The second shoulder sipes 50 include, for example, a transverse second shoulder sipe 51 completely traversing the second shoulder land portion 15 in the tire axial direction, and a terminated second shoulder sipe 52 extending in the tire axial direction at least from the second tread edge T2 and having a terminal end within the second shoulder land portion 15.

The terminated second shoulder sipe 52 is larger than any of the first middle sipe 30, the crown sipe 40 and the second middle sipe 45 with respect to the length in the tire axial direction. The length L10 in the tire axial direction of the second shoulder sipe 50 is preferably not less than 50%, more preferably not less than 60%, but preferably not more than 90%, more preferably not more than 80% of the width w11 in the tire axial direction of the second shoulder land portion 15. Such terminated second shoulder sipes 52 improve ride comfort and steering stability in a well-balanced manner.

Figure 10:
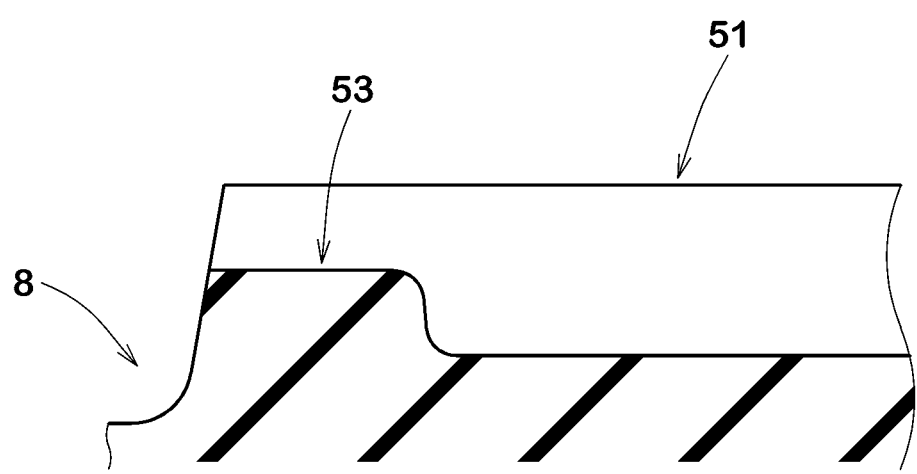
FIG. 10 is a cross-sectional view taken along line E-E of FIG. 9.

In FIG. 10, there is shown a cross-sectional view taken along line E-E of FIG. 9.

As shown in FIG. 10, the transverse second shoulder sipe 51 comprises a shallow bottom portion 53 where the bottom is locally raised. The shallow bottom portion 53 of the present embodiment is, for example, disposed in a communicating portion with the second shoulder circumferential groove 8.

The structure of the shallow bottom portion 23 of the first shoulder sipe 21 (shown in FIG. 6) can be applied to the shallow bottom portion 53 of the second shoulder sipe 50. Thus, the description is omitted here.

The transverse second shoulder sipe 51 comprising such shallow bottom portion 53 maintains the rigidity of the second shoulder land portion 15 and improves braking performance.

It is desirable that, as shown in FIG. 9, the total of the opening areas of the second shoulder sipes 50 disposed in the second shoulder land portion 15 is 24% to 49% of the ground contact area of the second shoulder land portion 15.

As shown in FIG. 1, in the present embodiment, each of the five land portions 4 is provided with only the sipes 16, and is not provided with a lateral groove for drainage. Thereby, the rigidity of each land portion is maintained, and pumping noise from the lateral grooves does not occur, so an improvement in noise performance is expected.

Other embodiments of the present disclosure are described below. In the figures showing other embodiments, elements that have already been described are given the same reference numerals as those described above, and the configurations described above can be applied thereto.

Figure 11:
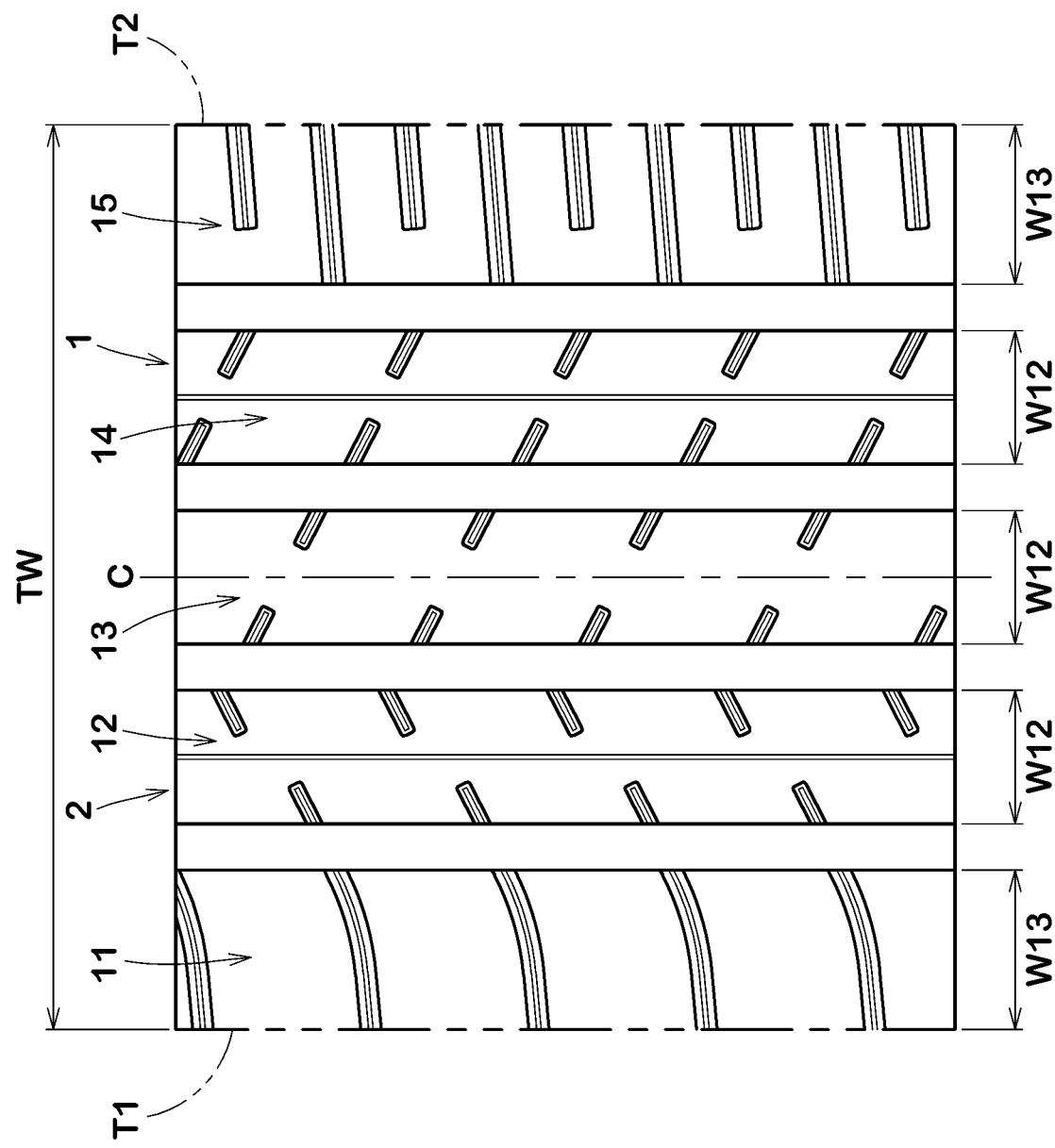
FIG. 11 is a developed view of a tread portion of another embodiment.

In FIG. 11, there is shown a developed view of the tread portion 2 of another embodiment.

As shown in FIG. 11, in the present embodiment, the first middle land portion 12, the crown land portion 13, and the second middle land portion 14 have the same axial width. These widths W12 in the tire axial direction are, for example, 10% to 20% of the tread width TW.

In the present embodiment, the first shoulder land portion 11 and the second shoulder land portion 15 have the same width in the tire axial direction. These widths W13 in the tire axial direction are, for example, 15% to 20% of the tread width TW.

In the embodiment of FIG. 11, the land portions configured as described above can further improve the uneven wear resistance performance of the tread portion 2.

Figure 12:
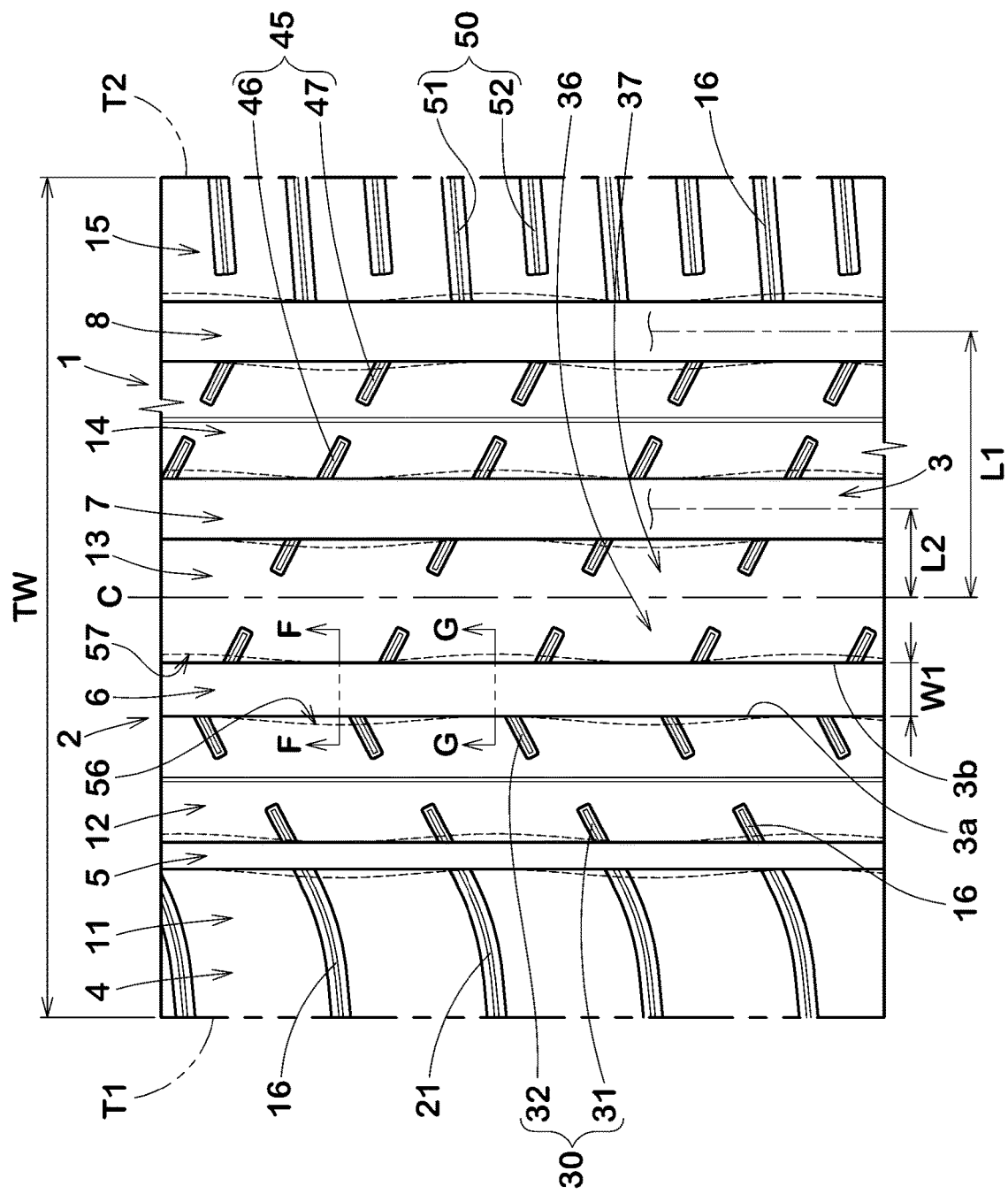
FIG. 12 is a developed view of a tread portion of another embodiment.

In FIG. 12, there is shown a developed view of the tread portion 2 of still another embodiment.

As shown in FIG. 12, the circumferential groove 3 of the present embodiment comprises a first groove wall 3a and a second groove wall 3b facing each other, and the first groove wall 3a is provided with a plurality of first recesses 56 recessed outward in the groove width direction from the circumferential groove 3's edge appearing in the tread surface of the tread portion 2. Further, the second groove wall 3b is provided with a plurality of second recesses 57 recessed outward in the groove width direction from the circumferential groove 3's edge appearing in the tread surface of the tread portion 2.

Such first recesses 56 and second recesses 57 can improve the drainage performance of the circumferential groove 3 and suppress the hydroplaning phenomenon effectively.

In addition, the first recesses 56 and the second recesses 57 can be expected to have the effect of reducing the sound pressure of noise generated by the circumferential groove 3, and are also useful for improving the noise performance.

It is desirable for the first recess 56 that the amount of recession from the groove edge gradually decreases toward both sides in the tire circumferential direction from the deepest portion of the first recess 56 which is most recessed outward in the groove width direction.

Similarly, it is desirable for the second recess 57 that the amount of recession from the groove edge gradually decreases toward both sides in the tire circumferential direction from the deepest portion of the second recess 57 which is most recessed outward in the groove width direction.

Such first recesses 56 and second recesses 57 prevent the land portion from forming portions where the rigidity is locally reduced, thereby suppressing uneven wear of the land portion.

In order to further enhance the effect described above, it is desirable that the first recesses 56 and the second recesses 57 are disposed alternately in the tire circumferential direction.

In the present embodiment, the land portion is provided with a plurality of sipes which communicate with the circumferential groove 3, and there are disposed one of the first recesses 56 and one of the second recesses 57 per a length of 1.0 to 3.0 times one pitch length of the sipes. In other words, a length in the tire circumferential direction of a pair of one first recess 56 and one second recess 57 is 1.0 to 3.0 times one pitch length of the sipes. Thereby, the noise performance is improved while maintaining the rigidity of the land portion.

Figure 13:
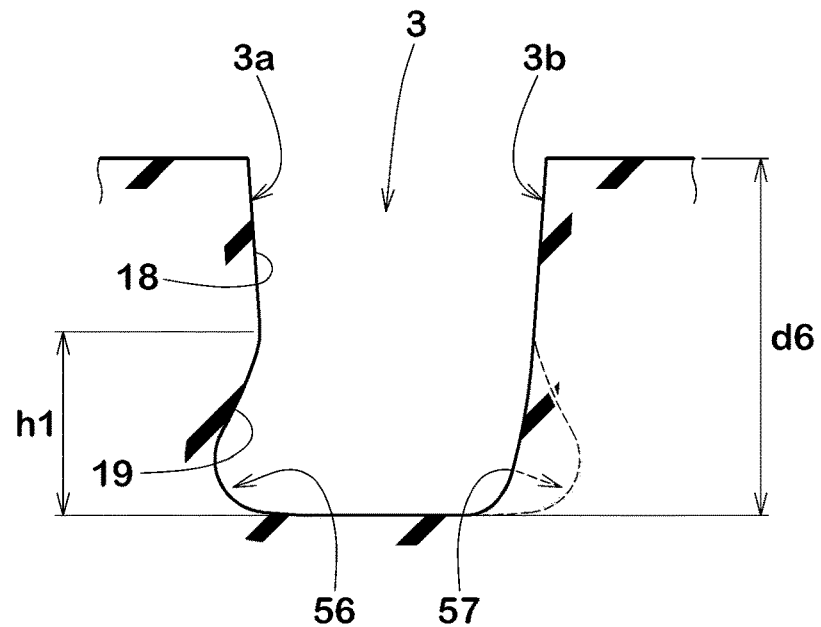
FIG. 13 is a cross-sectional view taken along line F-F of FIG. 12.

In FIG. 13, there is shown a cross-sectional view taken along line F-F of FIG. 12.

Figure 14:
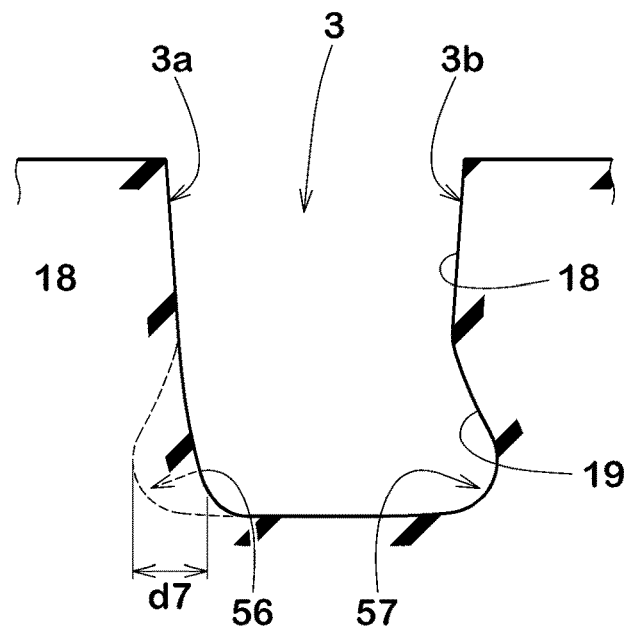
FIG. 14 is a cross-sectional view taken along line G-G of FIG. 12.

In FIG. 14, there is shown a cross-sectional view taken along line G-G of FIG. 12.

As shown in FIG. 13 and FIG. 14, the first groove wall 3a and the second groove wall 3b have substantially the same configuration. Also, the first recess 56 and the second recess 57 have substantially the same configuration. Therefore, it is possible to apply the configuration of the first groove wall 3a described below to the second groove wall 3b. Also, it is possible to apply the configuration of the first recess 56 to the second recess 57.

The first groove wall 3a comprises an outer portion 18 which extends from the groove edge of the circumferential groove 3 toward the inner side in the tire radial direction so as to decrease the groove width.

Further, the first groove wall 3a comprises an inner portion 19 which extends from the outer portion 18 to the inner side in the tire radial direction while being inclined to a direction so as to increase the groove width, and continues to the groove bottom. The inner portion 19 forms the bottom surface of the first recess 56.

The height h1 in the tire radial direction of the first recess 56 is, for example, 30% to 70%, preferably 40% to 60% of the entire depth d6 of the circumferential groove 3.

Such first recesses 56 can improve wet performance and noise performance while suppressing uneven wear of the land portion.

From a similar point of view, the depth d7 of the first recess 56 is, for example, 1.0 to 3.0 mm, preferably 1.5 to 2.5 mm. The depth d7 corresponds to the distance in the groove width direction (the direction parallel to the tread surface) from the first groove wall 3a where the first recess

56 is not provided to the deepest portion of the first recess 56. Needless to say, the height h1 and the depth d7 of the first recess 56 described above can be applied to the second recess 57 as well.

Figure 15:
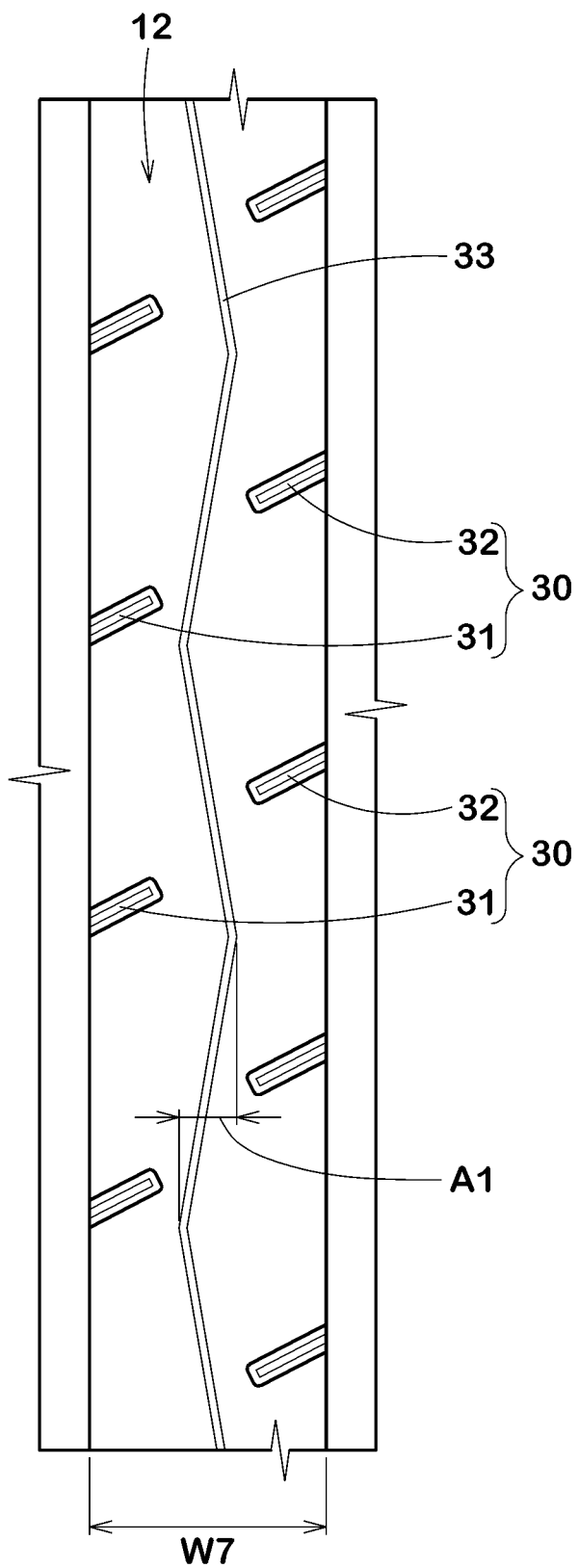
FIG. 15 is an enlarged view of a first middle land portion of another embodiment.

In FIG. 15, there is shown an enlarged view of the first middle land portion 12 of still another embodiment.

As shown in FIG. 15, the first longitudinal sipe 33 provided in the first middle land portion 12 extends zigzag in the tire circumferential direction. The first longitudinal sipe 33 may, for example, extend in a wavy shape with a smooth curve line. The amplitude A1 in the tire axial direction (peak-to-peak value) of the first longitudinal sipe 33 is, for example, 1.0% to 8.0% of the width w7 in the tire axial direction of the first middle land portion 12.

Further, the first longitudinal sipe 33 extends zigzag so as to form one cycle per two pitches of the first middle sipes 30. Such first longitudinal sipes 33 can provide frictional force in the tire circumferential direction too.

Figure 16:
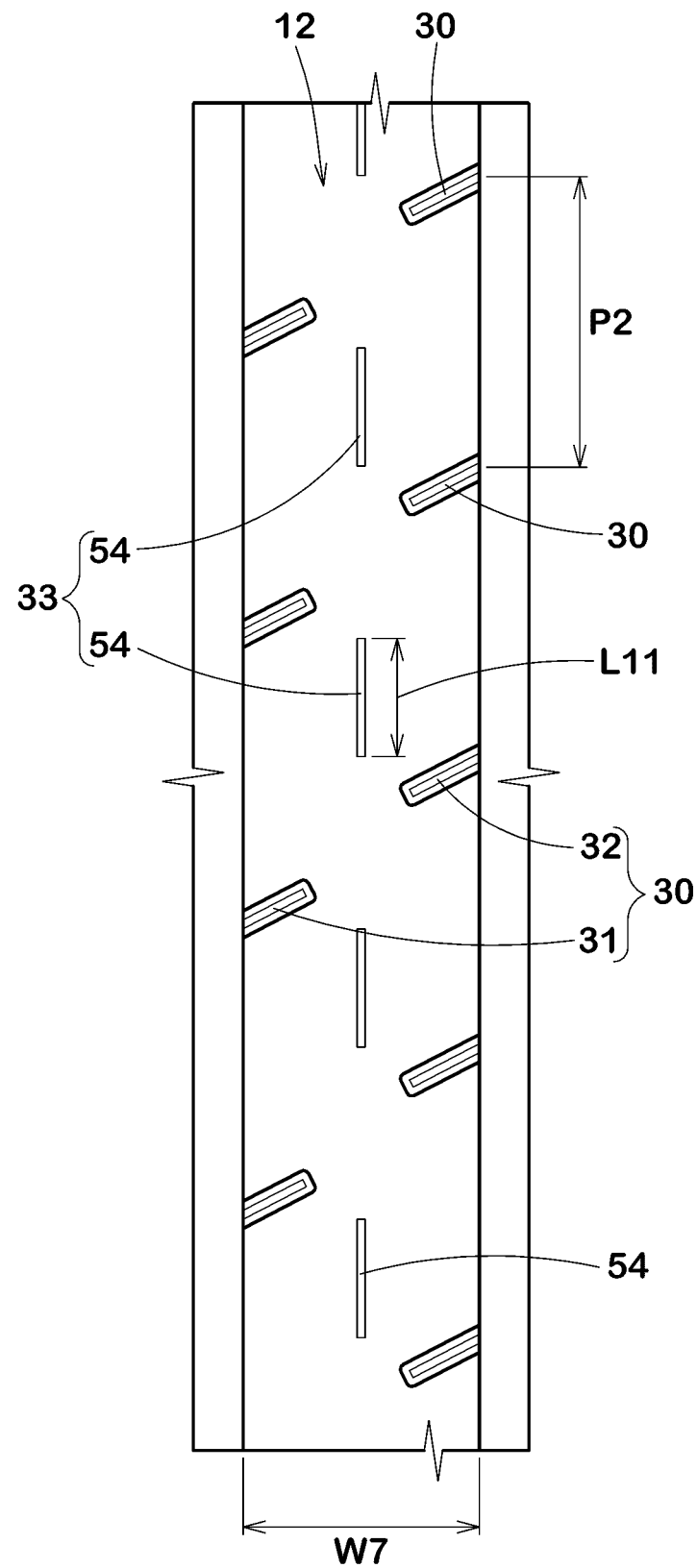
FIG. 16 is an enlarged view of a first middle land portion of another embodiment.

In FIG. 16, there is shown an enlarged view of the first middle land portion 12 of still another embodiment.

As shown in FIG. 16, the first longitudinal sipe 33 provided in the first middle land portion 12 intermittently extends in the tire circumferential direction. That is, the first longitudinal sipe 33 is made up of a plurality of longitudinal sipe pieces 54 arranged in the tire circumferential direction.

The length L11 in the tire circumferential direction of one longitudinal sipe piece 54 is, for example, 20% to 60% of the one pitch length P2 in the tire circumferential direction of the first middle sipes 30.

Such first longitudinal sipe 33 can provide a frictional force in the tire axial direction while maintaining the rigidity of the first middle land portion 12.

The configuration of the first longitudinal sipe 33 shown in FIG. 15 and FIG. 16 can also be applied to the second longitudinal sipe 48 provided in the second middle land portion 14.

Figure 17:
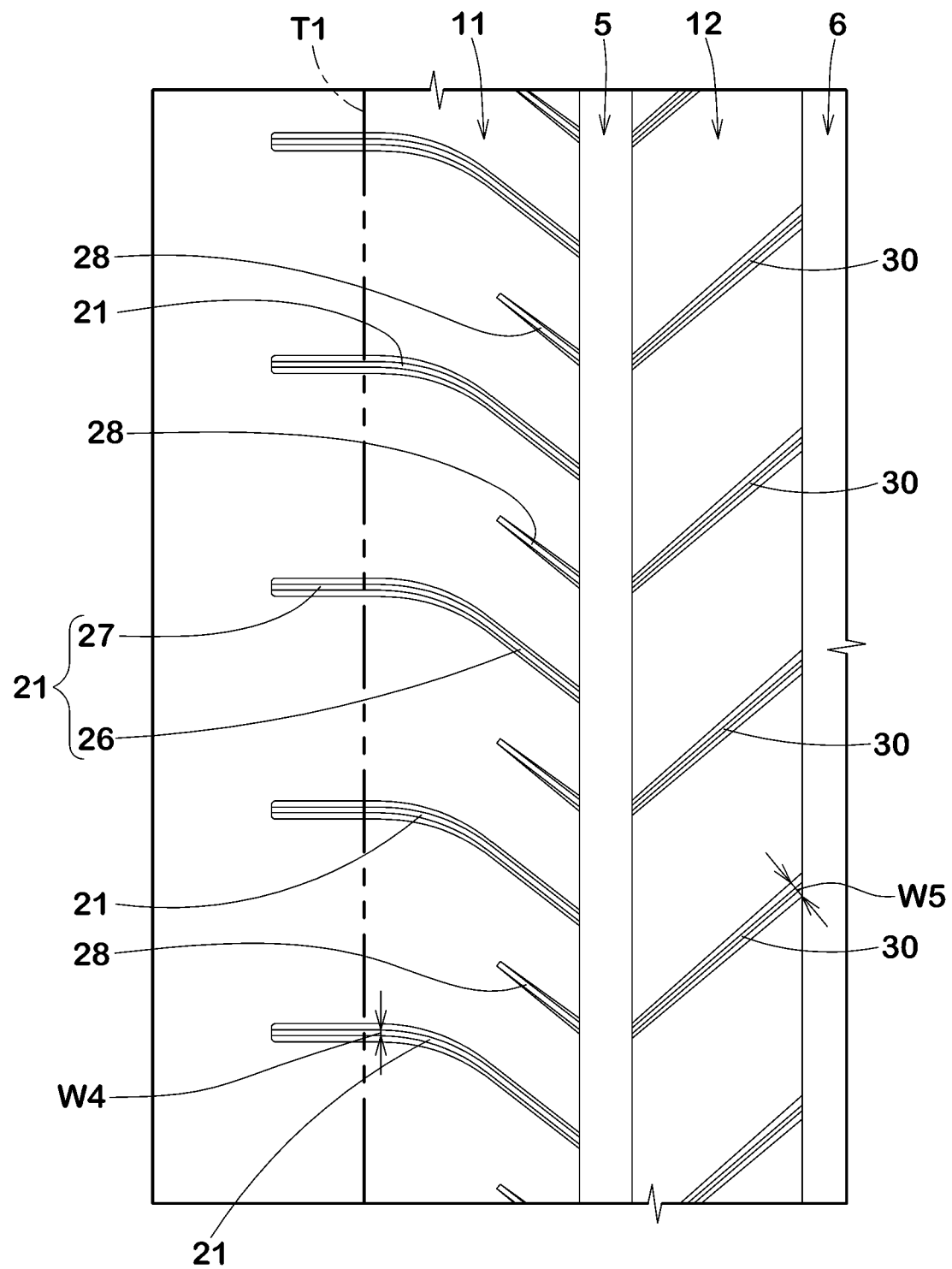
FIG. 17 is an enlarged view of a first shoulder land portion and a first middle land portion of another embodiment.

In FIG. 17, there is shown an enlarged view of the first shoulder land portion 11 and the first middle land portion 12 of still another embodiment.

As shown in FIG. 17, in the present embodiment, the opening width W4 of the first shoulder sipe 21 increases outward in the tire axial direction. Further, in the present embodiment, the opening width W5 of the first middle sipe 30 increases inward in the tire axial direction.

When the opening width varies in the longitudinal direction of the sipe as in the present embodiment, such a structure that "the opening width W4 at the tread surface of the first shoulder sipe 21 is larger than the opening width W5 at the tread surface of the first middle sipe 30" as described above, means that, when the maximum opening widths of the sipes are compared, the opening width W4 of the first shoulder sipe 21 is larger than the opening width W5 of the first middle sipe 30.

In the present embodiment, the opening width W4 is slightly larger than the opening width W5. The opening width W5 is, for example, 85% to 95% of the opening width W4.

The opening width means the width in the direction perpendicular to the longitudinal direction of the sipe.

The first shoulder sipe 21 of the present embodiment extends, for example, from the first shoulder circumferential groove 5 to a position beyond the first tread edge T1. The first shoulder sipe 21 comprises an inclined portion 26 and an axial portion 27. The inclined portion 26 extends from the first shoulder circumferential groove 5 while inclining with respect to the tire axial direction. The angle of the inclined portion 26 with respect to the tire axial direction is, for example, 30 to 50 degrees. The angle of the axial portion 27 with respect to the tire axial direction is smaller than the inclined portion 26. The angle of the axial portion 27 is, for example, not more than 10 degrees.

Such first shoulder sipe 21 comprising the inclined portion 26 and the axial portion 27 helps to improve steering stability and noise performance.

The first middle sipe 30 of the present embodiment, for example, completely crosses the first middle land portion 12 in the tire axial direction. The first middle sipe 30 is, for example, inclined with respect to the tire axial direction to the opposite direction to the inclined portion 26. The angle of the first middle sipe 30 with respect to the tire axial direction is, for example, 30 to 50 degrees. Such first middle sipe 30 can provide frictional forces in the tire circumferential direction and tire axial direction in a well-balanced manner.

The first shoulder land portion 11 of the present embodiment is provided with a plurality of terminated shoulder sipes 28 extending from the first shoulder circumferential groove 5 and terminated without reaching the first tread edge T1. Such terminated shoulder sipes 28 improve steering stability and noise performance in a well-balanced manner.

While detailed description has been made of a tire according to an embodiment of the present disclosure, the present disclosure is not limited to the above-described specific embodiment, and can be implemented with various modifications.

EXAMPLES

Tires of size 235/55R19 having the basic pattern shown in FIG. 1 were experimentally manufactured based on the specifications shown in Table 1.

Further, as a tire which serves as a reference for comparing various performances (reference tire), a tire having the pattern shown in FIG. 1 and having no widened portion in each sipe was experimentally manufactured.

As a comparative example, a tire in which the opening width of the first shoulder sipe was the same as the opening width of the first middle sipe was experimentally manufactured. The comparative example tire was substantially the same as that shown in FIG. 1, except for the items described above. Each test tire was tested for braking performance and noise performance on a dry road surface.

Common specifications for the test tires and test methods are as follows.

Mounting rim: 19×7.0 J
Tire internal pressure: 230 kPa
Test vehicle: 2000 cc displacement, four-wheel drive vehicle
Tire mounting positions: all wheels Brake Performance on Dry Road The braking distance was measured when the test vehicle was suddenly braked from 100 km/h on a dry road surface. As a result, the braking distance improvement amount, which is the difference from the braking distance of the reference tire, is shown as an index based on the braking distance improvement amount of the comparative example being 100. The larger the index, the greater the improvement in braking distance and the better the braking performance on dry roads.

Noise Performance

The test vehicle was driven on a dry road at 40 to 100 km/h, and the maximum sound pressure of the noise was measured in the vehicle. As for the results, the amount of sound pressure reduction, which is the difference from the sound pressure of the reference tire, is indicated by an index based on the amount of sound pressure reduction of the comparative example being 100. The larger the index, the smaller the maximum sound pressure of the noise, indicating that excellent noise performance is exhibited.

The test results are shown in Table 1.

TABLE 1

|  | Comparative Example | Example 1 | Example 2 | Example 3 | Example 4 | Example 5 | Example 6 | Example 7 | Example 8 | Example 9 |
|---|---|---|---|---|---|---|---|---|---|---|
| First shoulder sipe opening width W4 (mm) | 6.0 | 7.0 | 6.0 | 6.5 | 7.5 | 8.0 | 7.0 | 7.0 | 7.0 | 7.0 |
| First middle sipe opening width W5 (mm) | 6.0 | 5.0 | 5.0 | 5.0 | 5.0 | 5.0 | 4.0 | 4.5 | 5.5 | 6.0 |
| Opening width W5/ Opening width W4 (%) | 100 | 71 | 83 | 77 | 67 | 63 | 57 | 64 | 79 | 86 |
| Brake performance on dry road (Index) | 100 | 116 | 110 | 114 | 116 | 117 | 111 | 113 | 116 | 117 |
| Noise Performance (Index) | 100 | 123 | 125 | 124 | 119 | 115 | 124 | 123 | 120 | 117 |

From the test results, it was confirmed that the tires of Examples had improved braking performance on dry road surfaces. In addition, it was confirmed that the tires of Examples had improved noise performance.

Tires of size 235/55R19 having the basic pattern shown in FIG. 1 was experimentally manufactured based on the specifications shown in Table 2.

As Reference Example 1, there was experimentally manufactured a tire in which the depth of the widened portion of the first shoulder sipe and the depth of the widened portion of the first middle sipe were the same. The tire of Reference Example 1 was substantially the same as that shown in FIG. 1, except for the items described above.

Each test tire was tested for ride comfort and noise performance. The test method is as follows.

Riding Comfort

Ride comfort when the test vehicle was driven on a general road was evaluated by the driver's senses.

The results are scores based on the ride comfort of Reference Example 1 being 100, and the larger the number, the better the ride comfort.

Noise Performance

The noise performance test method described above was performed. As for the results, the amount of sound pressure reduction, which is the difference from the sound pressure of the reference tire, is indicated by an index based on the amount of sound pressure reduction of Reference Example 1 being 100. The results of the tests are shown in Table 2.

Tires of size 235/55R19 having the basic pattern shown in FIG. 12 were experimentally manufactured based on the specifications shown in Tables 3 and 4.

Further, as a tire for noise performance comparison (reference tire), there was experimentally manufactured a tire having a pattern shown in FIG. 12 and having no widened portion in each sipe. The reference tire was substantially the same as the pattern of FIG. 12, except for the items as described above.

As Reference Example 2, there was experimentally manufactured a tire in which the first shoulder sipes and the second shoulder sipes were made the same total number by omitting the terminated second shoulder sipes from the pattern shown in FIG. 12. The tire of Reference Example 2 was substantially the same as that shown in FIG. 12 except for the above-described particular. Each test tire was tested for wet performance and noise performance. The test methods were as follows.

Wet Performance

The wet performance when the test vehicle was run on a wet road surface was evaluated by the driver's senses.

The results are scores based on the wet performance of Reference Example 2 being 100, and the larger the number, the better the wet performance.

Noise Performance

The noise performance test method described above was performed. As for the results, the amount of sound pressure reduction, which is the difference from the sound pressure of

TABLE 2

|  | Reference Example 1 | Example 10 | Example 11 | Example 12 | Example 13 | Example 14 | Example 15 | Example 16 | Example 17 | Example 18 |
|---|---|---|---|---|---|---|---|---|---|---|
| Depth d1 (mm) of Widened portion of First shoulder sipe | 1.8 | 1.3 | 0.5 | 1.0 | 1.5 | 1.8 | 1.3 | 1.3 | 1.3 | 1.3 |
| Depth d2 (mm) of Widened portion of First middle sipe | 1.8 | 2.0 | 2.0 | 2.0 | 2.0 | 2.0 | 1.5 | 1.8 | 2.5 | 3.0 |
| Depth d1/Depth d2 (%) | 100 | 65 | 25 | 50 | 75 | 90 | 87 | 72 | 52 | 43 |
| Ride Comfort (Rating) | 100 | 110 | 105 | 108 | 109 | 111 | 107 | 109 | 110 | 111 |
| Noise Performance (Index) | 100 | 118 | 119 | 118 | 115 | 113 | 113 | 116 | 117 | 116 |

From the test results, it was confirmed that the tires of Examples had improved ride comfort and noise performance.

the reference tire, is shown as an index based on the amount of sound pressure reduction of Reference Example 2 being 100. The results of the tests are shown in Tables 3-4.

TABLE 3

| | Reference Example 2 | Example 19 | Example 20 | Example 21 | Example 22 | Example 23 | Example 24 | Example 25 | Example 26 | Example 27 |
|---|---|---|---|---|---|---|---|---|---|---|
| Total number of 2nd shoulder sipes/ Total number of 1st shoulder sipes | 1.0 | 2.0 | 1.3 | 1.5 | 1.8 | 2.2 | 2.5 | 2.8 | 2.0 | 2.0 |
| Height h1 of First and Second recesses/ Entire depth d6 of Circumferential groove (%) | 50 | 50 | 50 | 50 | 50 | 50 | 50 | 50 | 30 | 40 |
| Depth d7 (mm) of First and Second recesses | 2.0 | 2.0 | 2.0 | 2.0 | 2.0 | 2.0 | 2.0 | 2.0 | 2.0 | 2.0 |
| Length of a pair of First and Second recesses/ one pitch length of sipes | 2.0 | 2.0 | 2.0 | 2.0 | 2.0 | 2.0 | 2.0 | 2.0 | 2.0 | 2.0 |
| Wet Performance (Rating) | 100 | 110 | 104 | 106 | 109 | 110 | 110 | 112 | 106 | 108 |
| Noise Performance (Index) | 100 | 116 | 120 | 118 | 116 | 114 | 111 | 107 | 111 | 114 |

TABLE 4

| | Example 28 | Example 29 | Example 30 | Example 31 | Example 32 | Example 33 | Example 34 | Example 35 | Example 36 | Example 37 |
|---|---|---|---|---|---|---|---|---|---|---|
| Total number of 2nd shoulder sipes/ Total number of 1st shoulder sipes | 2.0 | 2.0 | 2.0 | 2.0 | 2.0 | 2.0 | 2.0 | 2.0 | 2.0 | 2.0 |
| Height h1 of First and Second recesses/ Entire depth d6 of Circumferential groove (%) | 60 | 70 | 50 | 50 | 50 | 50 | 50 | 50 | 50 | 50 |
| Depth d7 (mm) of first and second recesses | 2.0 | 2.0 | 1.0 | 1.5 | 2.5 | 3.0 | 2.0 | 2.0 | 2.0 | 2.0 |
| Length of a pair of first and second recesses/ one pitch length of sipes | 2.0 | 2.0 | 2.0 | 2.0 | 2.0 | 2.0 | 1.0 | 1.5 | 2.5 | 3.0 |
| Wet Performance (Rating) | 111 | 112 | 107 | 109 | 110 | 111 | 111 | 110 | 110 | 109 |
| Noise Performance (Index) | 116 | 116 | 112 | 115 | 116 | 113 | 103 | 105 | 116 | 114 |

From the test results, it was confirmed that the tires of Examples had improved wet performance and noise performance.

Additional Statement

The present disclosure includes the following aspects.

Present Disclosure 1

A tire having a tread portion, wherein
the tread portion comprises a plurality of circumferential grooves extending continuously in the tire circumferential direction between a first tread edge and a second tread edge, and a plurality of land portions divided by the circumferential grooves,
the plurality of land portions include a first shoulder land portion including the first tread edge and a first middle land portion adjacent to the first shoulder land portion, the first shoulder land portion is provided with a plurality of first shoulder sipes extending in the tire axial direction, the first middle land portion is provided with a plurality of first middle sipes extending in the tire axial direction, each of the first shoulder sipe and the first middle sipe comprises a maim portion extending in the tire radial direction and a widened portion which opens at the tread surface of the land portion and has a width greater than that of the maim portion, and
an opening width of the first shoulder sipe at the tread surface is larger than an opening width of the first middle sipe at the tread surface.

Present Disclosure 2

The tire according to the present disclosure 1, wherein the first shoulder sipe comprises a portion whose angle with respect to the tire axial direction increases toward the second tread edge.

Present Disclosure 3

The tire according to the present disclosure 1 or 2, wherein the circumferential grooves include a first shoulder circumferential groove between the first shoulder land portion and the first middle land portion, and each of the first shoulder sipe and the first middle sipe communicates with the first shoulder circumferential groove.

Present Disclosure 4

The tire according to the present disclosure 3, wherein in a tread plan view, the widened portion of the first middle sipe overlaps with a region obtained by extending the widened portion of the first shoulder sipe along its longitudinal direction.

Present Disclosure 5

The tire according to any one of the present disclosure 1 to 4, wherein the first shoulder land portion is provided with sipes only.

Present Disclosure 6

The tire according to any one of the present disclosures 1 to 5, wherein the tread portion has a specified mounting direction to a vehicle, and the first tread edge is positioned on an outer side of the vehicle when mounted on the vehicle.

Present Disclosure 7

The tire according to any one of present disclosures 1 to 6, wherein the depth of the widened portion of the first shoulder sipe is smaller than the depth of the widened portion of the first middle sipe.

Present Disclosure 8

The tire according to the present disclosure 7, wherein the first shoulder sipe comprises a shallow portion where the bottom is locally raised.

Present Disclosure 9

The tire according to the present disclosure 7 or 8, wherein the first middle land portion comprises a first longitudinal edge on the first tread edge side, a second longitudinal edge on the second tread edge side, and a tread surface between the first longitudinal edge and the second longitudinal edge, and the first middle sipes include an outer first middle sipe extending from the first longitudinal edge and having a terminal end within the first middle land portion, and an inner first middle sipe extending from the second longitudinal edge and having a terminal end within the first middle land portion.

Present Disclosure 10

The tire according to the present disclosure 9, wherein the maximum depth of the outer first middle sipe is less than the maximum depth of the inner first middle sipe.

Present Disclosure 11

The tire according to any one of the present disclosures 1 to 10, wherein the tread portion has a specified mounting direction to a vehicle,
the first tread edge is positioned on an outer side of the vehicle when mounted on the vehicle,
the plurality of land portions include a second shoulder land portion including the second tread edge,
the second shoulder land portion is provided with a plurality of second shoulder sipes extending in the tire axial direction, and the total number of the second shoulder sipes is larger than the total number of the first shoulder sipes.

Present Disclosure 12

The tire according to the present disclosure 11, wherein the first shoulder sipe and the second shoulder sipe are inclined to the same direction with respect to the tire axial direction.

Present Disclosure 13

The tire according to present disclosure 11 or 12, wherein the maximum angle of the first shoulder sipe with respect to the tire axial direction is larger than the maximum angle of the second shoulder sipe with respect to the tire axial direction.

Present Disclosure 14

The tire according to any one of the present disclosures 11 to 13, wherein the second shoulder sipes include a transverse second shoulder sipe which completely crosses the second shoulder land portion in the tire axial direction, and a terminated second shoulder sipe which extends in the tire axial direction from at least the second tread edge and having a terminal end terminated within the second shoulder land portion.

Present Disclosure 15

The tire according to any one of the present disclosure 11 to 14, wherein the circumferential groove comprises a first groove wall and a second groove wall facing each other, the first groove wall is provided with a plurality of first recesses which are recessed outward in the groove width direction from a groove edge of the circumferential groove which appears in the tread surface of the tread portion,
the second groove wall is provided with a plurality of second recesses which are recessed outward in the groove width direction from a groove edge of the circumferential groove which appears in the tread surface of the tread portion,
in each of the first recess and the second recess, the amount of recession from the groove edge gradually decreases from the deepest portion which is most recessed outward in the groove width direction toward both sides thereof in the tire circumferential direction,
the land portion adjacent to the circumferential groove is provided with a plurality of sipes communicating with the circumferential groove and arranged in the tire circumferential direction, and
one of the first recesses and one of the second recesses are provided per a length of 1.0 to 3.0 times one pitch length of the sipes.

The invention claimed is:

1. A tire comprising a tread portion having a first tread edge and a second tread edge, wherein
the tread portion comprises circumferential grooves extending continuously in the tire circumferential direction, and land portions divided by the circumferential grooves,
the land portions include a first shoulder land portion including the first tread edge and a first middle land portion adjacent to the first shoulder land portion,
the first shoulder land portion is provided with first shoulder sipes extending in the tire axial direction,
each of the first shoulder sipes comprises a main portion extending in the tire radial direction and a widened portion which opens at a tread surface of the first shoulder land portion and has a width greater than that of the main portion,
the first middle land portion is provided with first middle sipes extending in the tire axial direction,
each of the first middle sipes comprises a main portion extending in the tire radial direction and a widened portion which opens at a tread surface of the first middle land portion and has a width greater than that of the main portion, and
an opening width of each first shoulder sipe at the tread surface is larger than an opening width of each first middle sipe at the tread surface,
wherein
the depth of the widened portion of each first shoulder sipe is smaller than the depth of the widened portion of each first middle sipe.

2. The tire according to claim 1, wherein each first shoulder sipe comprises a shallow portion where the bottom is locally raised.

3. The tire according to claim 1, wherein
the first middle land portion comprises a first longitudinal edge on the first tread edge side, a second longitudinal edge on the second tread edge side, and a tread surface between the first longitudinal edge and the second longitudinal edge, and
the first middle sipes include an outer first middle sipe extending from the first longitudinal edge and having a terminal end within the first middle land portion, and an inner first middle sipe extending from the second longitudinal edge and having a terminal end within the first middle land portion.

4. The tire according to claim 3, wherein in a tread plan view, the widened portion of the outer first middle sipe overlaps with a region obtained by extending the widened portion of one of the first shoulder sipes along its longitudinal direction.

5. The tire according to claim 3, wherein
the maximum depth of the outer first middle sipe is less than the maximum depth of the inner first middle sipe.

6. The tire as set forth in claim 5, wherein
the land portions include a second shoulder land portion including the second tread edge,
the second shoulder land portion is provided with second shoulder sipes extending in the tire axial direction, and
the total number of the second shoulder sipes is larger than the total number of the first shoulder sipes.

7. The tire according to claim 6, wherein
the tread portion has a specified mounting direction to a vehicle, and
the first tread edge is positioned on an outer side of the vehicle when mounted on the vehicle.

8. A tire comprising a tread portion having a first tread edge and a second tread edge, wherein
the tread portion comprises circumferential grooves extending continuously in the tire circumferential direction, and land portions divided by the circumferential grooves,
the land portions include a first shoulder land portion including the first tread edge and a first middle land portion adjacent to the first shoulder land portion,
the first shoulder land portion is provided with first shoulder sipes extending in the tire axial direction,
each of the first shoulder sipes comprises a main portion extending in the tire radial direction and a widened portion which opens at a tread surface of the first shoulder land portion and has a width greater than that of the main portion,
the first middle land portion is provided with first middle sipes extending in the tire axial direction,
each of the first middle sipes comprises a main portion extending in the tire radial direction and a widened portion which opens at a tread surface of the first middle land portion and has a width greater than that of the main portion,
an opening width of each first shoulder sipe at the tread surface is larger than an opening width of each first middle sipe at the tread surface,
the tread portion has a specified mounting direction to a vehicle such that the first tread edge is positioned on an outer side of the vehicle when mounted on the vehicle,
the land portions include a second shoulder land portion including the second tread edge,
the second shoulder land portion is provided with second shoulder sipes extending in the tire axial direction,
the total number of the second shoulder sipes is larger than the total number of the first shoulder sipes, and
the maximum angle of each first shoulder sipe with respect to the tire axial direction is larger than the maximum angle of each second shoulder sipe with respect to the tire axial direction.

9. The tire according to claim 8, wherein each first shoulder sipe comprises a portion whose angle with respect to the tire axial direction increases toward the second tread edge so as to have said maximum angle of the first shoulder sipe.

10. A tire comprising a tread portion having a first tread edge and a second tread edge, wherein
the tread portion comprises circumferential grooves extending continuously in the tire circumferential direction, and land portions divided by the circumferential grooves,
the land portions include a first shoulder land portion including the first tread edge and a first middle land portion adjacent to the first shoulder land portion,
the first shoulder land portion is provided with first shoulder sipes extending in the tire axial direction,
each of the first shoulder sipes comprises a main portion extending in the tire radial direction and a widened portion which opens at a tread surface of the first shoulder land portion and has a width greater than that of the main portion,
the first middle land portion is provided with first middle sipes extending in the tire axial direction,
each of the first middle sipes comprises a main portion extending in the tire radial direction and a widened portion which opens at a tread surface of the first middle land portion and has a width greater than that of the main portion,
an opening width of each first shoulder sipe at the tread s1urface is larger than an opening width of each first middle sipe at the tread surface,
the tread portion has a specified mounting direction to a vehicle such that the first tread edge is positioned on an outer side of the vehicle when mounted on the vehicle,
the land portions include a second shoulder land portion including the second tread edge,
the second shoulder land portion is provided with second shoulder sipes extending in the tire axial direction,
the total number of the second shoulder sipes is larger than the total number of the first shoulder sipes,
each of the circumferential grooves comprises a first groove wall and a second groove wall facing each other,
the first groove wall is provided with first recesses which are recessed outward in the groove width direction from a groove edge of the circumferential groove which appears in the tread surface of the tread portion,
the second groove wall is provided with second recesses which are recessed outward in the groove width direction from a groove edge of the circumferential groove which appears in the tread surface of the tread portion,
in each of the first recesses and the second recesses, the amount of recession from the respective groove edge gradually decreases from the deepest portion which is most recessed outward in the groove width direction, toward both sides thereof in the tire circumferential direction,
each of the land portions adjacent to the circumferential grooves is provided with sipes each communicating with the adjacent circumferential groove or one of the adjacent circumferential grooves and arranged in the tire circumferential direction, and
in each of the circumferential grooves,
the first recesses are provided, one per a length of 1.0 to 3.0 times one pitch length of the sipes communicating with the first groove wall of the circumferential groove, and
the second recesses are provided, one per a length of 1.0 to 3.0 times one pitch length of the sipes communicating with the second groove wall of the circumferential groove.

11. The tire as set forth in claim 10, wherein the first shoulder sipes and the second shoulder sipes are inclined to a same direction with respect to the tire axial direction.

12. The tire as set forth in claim 11, wherein the second shoulder sipes are
transverse second shoulder sipes which completely cross the second shoulder land portion in the tire axial direction, and
terminated second shoulder sipes which extend in the tire axial direction from the second tread edge and are terminated within the second shoulder land portion.

13. The tire as set forth in claim 12, wherein
the first shoulder land portion is provided with the first shoulder sipes only, and
the second shoulder land portion is provided with the second shoulder sipes only.

* * * * *